United States Patent
Sato

(12) United States Patent    (10) Patent No.: US 6,904,514 B1
Sato    (45) Date of Patent: Jun. 7, 2005

(54) DATA PROCESSOR

(75) Inventor: Tomoyoshi Sato, Tsukuba (JP)

(73) Assignee: IPFlex Inc., Tokyo (JP)

( * ) Notice: Subject to any disclaimer, the term of this patent is extended or adjusted under 35 U.S.C. 154(b) by 658 days.

(21) Appl. No.: 09/830,704

(22) PCT Filed: Aug. 30, 2000

(86) PCT No.: PCT/JP00/05848

§ 371 (c)(1),
(2), (4) Date: Aug. 6, 2001

(87) PCT Pub. No.: WO01/16710

PCT Pub. Date: Mar. 8, 2001

(30) Foreign Application Priority Data

Aug. 30, 1999 (JP) .......................................... 11-244137

(51) Int. Cl.$^7$ ............................................. G06F 9/30
(52) U.S. Cl. ..................................................... 712/212
(58) Field of Search ........................... 712/15, 35, 209, 712/212

(56) References Cited

U.S. PATENT DOCUMENTS

| 5,038,386 A | | 8/1991 | Li |
| 5,742,180 A | | 4/1998 | DeHon et al. ................ 326/40 |
| 5,771,362 A | * | 6/1998 | Bartkowiak et al. ........ 710/317 |
| 5,956,518 A | | 9/1999 | DeHon et al. ......... 395/800.15 |
| 5,966,534 A | | 10/1999 | Cooke et al. ................ 395/705 |
| 5,970,254 A | | 10/1999 | Cooke et al. .......... 395/800.37 |
| 6,052,773 A | | 4/2000 | DeHon et al. ................. 712/43 |
| 6,105,105 A | * | 8/2000 | Trimberger .................. 711/103 |
| 6,128,720 A | * | 10/2000 | Pechanek et al. ............. 712/20 |
| 6,145,074 A | * | 11/2000 | Asato .......................... 712/218 |
| 6,195,740 B1 | | 2/2001 | Heishi et al. |

FOREIGN PATENT DOCUMENTS

| JP | S50-92058 | 7/1975 |
| JP | 61294548 A | 12/1986 |
| JP | 01156824 A | 6/1989 |
| JP | 02183332 A | 7/1990 |
| JP | 06309285 | 11/1994 |
| JP | 07253882 | 10/1995 |
| JP | 07319692 | 12/1995 |
| JP | 10260832 | 9/1998 |
| JP | H11-053187 | 2/1999 |
| JP | 2000-207202 | 7/2000 |

OTHER PUBLICATIONS

English translation of International Preliminary Examination. PCT/JP00/05848.

International Search Report, International Application No. PCT/JP00/05848, Oct. 24, 2000.

* cited by examiner

*Primary Examiner*—Eric Coleman
(74) *Attorney, Agent, or Firm*—Marshall, Gerstein & Borun LLP

(57) ABSTRACT

An instruction set is provided which has a first field for describing an execution instruction for designating content of an operation or data processing that is executed in at least one processing unit forming a data processing system, and a second field for describing preparation information for setting the processing unit to such a state that is ready to execute an operation or data processing that is executed according to the execution instruction, thereby making it possible to provide a control program having the instruction set in which preparation information independent of the execution instruction described in the first field is described in the second field. Accordingly preparation for execution of the subsequent execution instruction is made based on the preparation information. In the instruction set, since destination of branch instruction is described in the second field and is known in advance, the problems that cannot be solved with a conventional instruction set can be solved.

55 Claims, 12 Drawing Sheets

```
LOOP:   MOVE R0, #00000000H"    MOVE R3, #START.    1CLK
        MOVE R1, [R3]"          ADD  R3,R3,#0001.   1CLK
        CMP  EQ,R1,#END"        JYES LEXIT.         1CLK
        CMP  HI,R0,R1"          JYES LOOP.          1CLK
        MOVE R0,R1"             JMP  LOOP.          1CLK

LNEXT:
```

42

```
             ┌ DFLWI  = MOVE  DPLR0,#00000000H"   MOVE  DPLR3,#START       1CLK
             │ DFLWC = MOVE  DPLR1,[R3]"          ADD   DPLR3,DPLR3,#0001  1CLK
         44  │ DFLWT = STOP.EQ  DPLR1,#END.                                1CLK
             │ DFLWC = LDMAX,DPLR0,DPLR0,DPLR1                             1CLK
             └ DFLWS = START                                               1CLK

25          MOVE  R0,#012345678"     MOVE  R1,#NEXT_JOB
            ADD   R5,R2,R3"          CALL  FUNC_ABCD
            CMP   R0,R1
              ..
            WAIT  DFLW, DP1                    ;wait for the termination of above data processing.
            MOVE  R0,DP1.R0                    ;get the max data in the search table
```

DATA PROCESSOR

TECHNICAL FIELD

The present invention relates to a control program product described with microcodes or the like, and a data processing system capable of executing the control program.

BACKGROUND OF INVENTION

Processors (data processing systems or LSIs) incorporating an operation function such as microprocessor (MPU) and digital signal processor (DSP) are known as apparatuses for conducting general-purpose processing and special digital data processing. Architectural factors that have significantly contributed to improved performance of these processors include pipelining technology, super-pipelining technology, super-scalar technology, VLIW technology, and addition of specialized data paths (special purpose instructions). The architectural elements further include branch prediction, register bank, cache technology, and the like.

There is a clear difference in performance between non-pipeline and pipeline. Basically, with the same instruction, the number of pipeline stages reliably improves throughput. For example, the four-stage pipeline can be expected to achieve at least fourfold increase in throughput, and the eight-stage pipeline will achieve eightfold increase in throughput, which means that the super-pipeline technology additionally improves the performance twice or more. Since the progress in process enables segmentation of the critical paths, an upper limit of an operating frequency will be significantly improved and the contribution of the pipeline technology will be further increased. However, the delay or penalty of a branch instruction has not been eliminated, and whether a super-pipeline machine will succeed or not depends on how much a multi-stage delay corresponding to the memory accesses and branches can be handled with instruction scheduling by a compiler.

The super-scalar technology is the technology of simultaneously executing instructions near a program counter with sophisticated internal data paths. Also supported by the progress in compiler optimization technology, this technology has become capable of executing about four to eight instructions simultaneously. In many cases, however, the instruction itself frequently uses the most recent operation result and/or result in a register. Aside from the peak performance, this necessarily reduces the average number of instructions that can be executed simultaneously to a value much smaller than that described above even by making full use of various techniques such as forwarding, instruction relocation, out-of-order and register renaming. In particular, since it is impossible to execute a plurality of conditional branch instructions or the like, the effects of the super-scalar technology are further reduced. Accordingly, the degree of contribution to improved performance of the processor would be on the order of about 2.0 to 2.5 times on the average. Should an extremely well compatible application exist, a practical degree of contribution would be on the order of four times or less.

The VLIW technology comes up as the next technology. According to this technology, the data paths are configured in advance so as to allow for parallel execution, optimization is conducted so that a compiler improves the parallel execution and generate a proper VLIW instruction code. This technology adopts an extremely rational idea, eliminating the need for the circuitry for checking the likelihood of parallel execution of individual instructions as in the super-scalar. Therefore, this technology is considered to be extremely promising as means for realizing the hardware for parallel execution. However, this technology is also incapable of executing a plurality of conditional branch instructions. Therefore, a practical degree of contribution to performance would be on the order of about 3.5 to 5 times. In addition, given a processor for use in processing of an application that requires image processing or special data processing, the VLIW is not an optimal solution either. This is because, particularly in applications requiring continuous or sequential processing using the operation results, there is a limit in executing operations or data processing while holding the data in a general-purpose register as in VLIW. This problem is the same in the conventional pipeline technology.

On the other hand, it is well known from the past experiences that various matrix calculations, vector calculations and the like are conducted with higher performance when implemented in dedicated circuitry. Therefore, in the most advanced technology for achieving the highest performance, the idea based on the VLIW becomes major with the various dedicated arithmetic circuits mounted according to the purpose of applications.

However, the VLIW is the technology of improving the parallel-processing execution efficiency near a program counter. Therefore, the VLIW is not so effective in, e.g., executing two or more objects simultaneously or executing two or more functions. Moreover, mounting various dedicated arithmetic circuits increases the hardware, also reduces software flexibility. Furthermore, it is essentially difficult to solve the penalty occurs in executing conditional branching.

It is therefore an object of the present invention to study the problems from a different standpoint of these conventional technologies for increasing the processor speed, and to provide a new solution. More specifically, it is an object of the present invention to provide a system, i.e., a control program product, capable of improving the throughput like pipeline while solving the penalty in executing the conditional branching, a data processing system capable of executing the control program, and its control method. It is another object of the present invention to provide a control program product capable of flexibly executing individual data processing, even if they are complicated data processing, at a high speed without having to use a wide variety of dedicated circuits specific to the respective data processing. Also, providing a data processing system capable of executing the program, and its a control method are one of the object of this invention.

SUMMARY OF THE INVENTION

The inventor of the present application found that the problems as described above are caused by the limitations of the instruction set for the conventional non-pipeline technology being the base of the technologies above. More specifically, the instruction set (instruction format) of a program (microcodes, assembly codes, machine languages, or the like) defining the data processing in a processor is a mnemonic code formed from combination of an instruction operation (execution instruction) and an operand defining environment or interface of registers to be used in executing that instruction. Accordingly, the whole aspect of the processing designated by the instruction set is completely understood when looking the conventional instruction set, contrary any aspect of the instruction set cannot be known at all until the instruction set appears and being decoded. The present invention significantly changes structure of instruction-set itself, thereby successively solving the aforementioned problems that are hard to address with the prior art, and enabling significant improvement in performance of the data processing system.

In the present invention, an instruction set including a first field for describing (recording) an execution instruction for designating content of an operation or data processing that is executed in at least one processing unit forming a data processing system, and a second field for describing (recording) preparation information for setting the processing unit to such a state that is ready to execute an operation or data processing that is executed according to the execution instruction, is provided so that the preparation information for the operation or data processing that is independent of the content of the execution instruction described in the first field in the instruction set is described in the second field. Thus, the present invention provides a control program product or control program apparatus comprising the above instruction set. This control program can be provided in the form recorded or stored on an appropriate recording medium readable with a data processing system, or in the form embedded in a transmission medium transmitted over a computer network or another communication.

The processing unit is an appropriate unit for forming the data processing system and into which the data processing system can be divided in terms of functionality or data path, and the unit includes a control unit, an arithmetic unit, and a processing unit or data flow processing unit having a somewhat compact data path being capable of handles as a template or the like having a specific data path.

A data processing system according to the present invention comprises: at least one processing unit for executing an operation or data processing; a unit for fetching an instruction set including a first field for describing an execution instruction for designating content of the operation or data processing that is executed in the processing unit, and a second field for describing preparation information for setting the processing unit to a state that is ready to execute the operation or data processing that is executed according to the execution instruction; a first execution control unit for decoding the execution instruction in the first field and proceeding with the operation or data processing by the processing unit that is preset so as to be ready to execute the operation or data processing of the execution instruction; and a second execution control unit for decoding the preparation information in the second field and, independently of content of the proceeding of the first execution control unit, setting a state of the processing unit so as to be ready to execute another operation or data processing.

A method for controlling a data processing system including at least one processing unit for executing an operation or data processing according to the present invention includes: a step of fetching the instruction set including the aforementioned first and second fields; a first control step of decoding the execution instruction in the first field and proceeding with the operation or data processing by the processing unit that is preset so as to be ready to execute the operation or data processing of the execution instruction; and a second control step of decoding, independently of the first control step, the preparation information in the second field and setting a state of the processing unit so as to be ready to execute an operation or data processing.

The instruction set according to the present invention has a first field for describing an execution instruction, and a second field for describing preparation information (preparation instruction) that is independent of the execution instruction and includes the information such as register and immediate data. Accordingly, in an arithmetic instruction, an instruction operation such as "ADD" is described in the first field, and an instruction or information specifying registers is described in the second field. It seems be in apparently the same instruction set as the conventional assemble code, however, the execution instruction and the preparation information are independent of each other, and therefore are not correspond to each other within the same instruction set. Therefore, this instruction set has a property that a processing to be executed by the processing unit of the data processing system, such as a control unit, cannot be completely understood or being not completely specified by itself. In other words, the instruction set according to the present invention is significantly different from the conventional mnemonic code. In the present invention, the instruction operation and its corresponding operand, which are conventionally described in a single or the same instruction set, are allowed to be defined individually and independently, so that the processing that cannot be realized with the conventional instruction set becomes readily performed.

The preparation information for the execution instruction described in the first field of a subsequent instruction set is describable in the second field. This becomes possible to make preparation for execution of an execution instruction before an instruction set including that execution instruction appears. In other words, it is possible to set the processing unit to such a state that is ready to execute an operation or data processing that is executed according to the execution instruction prior to that execution instruction. For example, it is possible to describe an instruction for operating at least one arithmetic/logic unit included in a control unit of the data processing system in the first field of a certain instruction set (instruction format or instruction record). And it is possible to describe an instruction or information for defining interfaces of the arithmetic/logic unit such as a source register or destination register for the above operation in that at least one arithmetic/logic unit in the second field of the preceding instruction set. Thus, before the execution instruction is fetched, the register information of the arithmetic/logic unit is decoded, and the registers are set. Then, the logic operation is performed according to the subsequently fetched execution instruction, and the result thereof is stored in the designated register. It is also possible to describe the destination register in the first field together with the execution instruction.

Accordingly, with the instruction set of the present invention, the data processing can be conducted in multiple stages like the pipeline processing and the throughput is improved. Namely, an instruction "ADD, R0, R1, #1234H" means that a register R1 and data #01234H are added together and the result is stored in a register R0. However, in terms of the hardware architecture, it is advantageous for high-speed processing to execute or perform the read process from the register R0 and data "#01234H" to the input registers of the data path to which an arithmetic adder ADD, i.e., arithmetic/logic unit belongs, overlapping with the execution cycle of the previous instruction set that is one clock before the execution cycle of the execution instruction ADD. In this case, purely the arithmetic addition is conducted, AC characteristics (execution frequency characteristics) becomes improved. In the conventional pipeline processing, this problem would be also improved to some degree when the number of pipeline stages is increased so as to consume a single stage exclusively for a read cycle from a register file. However, in the conventional pipeline processing, the above method necessarily increases the delay of output. In contrast, the present invention can solve the problem without increasing the delay.

In the instruction set of the present invention, it is possible to describe the preparation information prior to the execution instruction. Therefore, in a branch instruction such as conditional branch instruction, branch destination information is provided to the control unit prior to the execution instruction. Namely, in the conventional mnemonic code, a human can understand the whole meaning of the instruction set at a glance, but cannot know it until the instruction set appears. In contrast, in the instruction set of the present invention, the whole meaning of the instruction set cannot be understood at a glance, but information associated with the execution instruction are provided before the execution instruction appears. Thus, since the branch destination is assigned prior to the execution instruction, it is also possible to fetch the instruction set at the branch destination, and also to make preparation for the execution instruction at the branch destination in advance.

In general, most of the current CPUs/DSPs have successively increased the processing speed by shifting the pipeline processing to a later stage (later in the time base). However, problems come to the surface upon execution of branch and CALL/RET of program. More specifically, since the fetch address information has not been obtained in advance, the above problems are essentially causes penalty that cannot be solved in principle. Of course, branch prediction, delayed branch, high-speed branch buffer, or high-speed loop handling technology employed in DSP have succeeded in significantly reducing such penalty. However, the problems come to the surface again when a number of successive branches occur, and therefore it is a well-known fact that those technologies provide no essential solution.

Moreover, in the conventional art, the register information required by the subsequent instruction cannot be obtained in advance. This increases complexity of forwarding processing or bypass processing for increasing the pipeline processing speed. Therefore, increasing the processing speed by the prior art cause a significant increase in hardware costs.

As described above, in the conventional instruction set, the address information of the branch destination is obtained only after decoding the instruction set, making it difficult to essentially solve the penalty produced upon execution of conditional branching. In contrast, in the instruction set of the present invention, since the branch destination information is obtained in advance, the penalty produced upon execution of conditional branching is eliminated. Moreover, if the hardware has enough capacity or scale, it is also possible to fetch the preparation instruction at the branch destination so as to make preparation for the subsequent execution instruction after the branch. If the branch condition is not satisfied, only the preparation is wasted, causing no penalty of the execution time.

Moreover, since the register information required by the subsequent instruction is known simultaneously with or prior to the instruction execution, the processing speed can be increased without increasing the hardware costs. In the present invention, a part of the processing stage conventionally conducted on the hardware in the conventional pipeline processing is successfully implemented on the software processing in advance during compiling or assembling stage.

In the data processing system of the present invention, the second execution control unit for processing based on the preparation information may be a unit that is capable of dynamically controlling changeable architecture by connection between transistors, such as FPGA (Field Programmable Gate Arrays). However, it consumes much time to dynamically change the hardware like the FPGA, and an additional hardware is required for reducing that time for reconfiguration. It is also possible to store the reconfiguration information of the FPGA in RAM having two faces or more and the reconfiguration is executed in the background so as to dynamically change the architecture in an apparently short time. However, in order to enable the reconfiguration to be conducted within several clocks, it is required to mount a RAM and store all of a possible number of combinations of reconstruction information. This does not at all essentially solve the economical problem of a long reconfiguration time of the FPGA. Moreover, due to the architecture of FPGA for enabling efficient mapping basing on the gate like hardware, the poor AC characteristics of the FPGA at the practical level, the original problem of the FPGA, is not likely to be solved for the time being.

In contrast, in the present invention, an input and/or output interface of the processing unit is separately defined as preparation information independently of the time of the execution (execution timing) of the processing unit. Thus, in the second execution unit or the second control step, the input and/or output interface of the processing unit can be separately set independently of the execution timing of the processing unit. Accordingly, in the data processing system having a plurality of processing units, by the second execution control unit or the second control step, combination of data paths by these processing units can be controlled independently of the execution. Therefore, an instruction defining an interface of at least one processing unit such as arithmetic/logic unit included in the data processing system recorded or described in the second field becomes data flow designation. This enables improvement in independence of the data path. As a result, the data flow designation is performed while executing another instruction program. Also, an architecture that an internal data path of the control unit or data processing system in the idle state allows to be lent for a more urgent process being performed in another external control unit or data processing system is provided.

Moreover, information also defining content of processing and/or circuit configuration of the processing unit are included in the preparation information. Therefore, the second execution control unit or the second control step designates the processing content (circuit configuration) of the processing unit. Thus, the data path can be configured more flexibly.

Furthermore, the second execution control unit or the second control step has a function as a scheduler for managing combination of data paths such as defining the interface of the arithmetic/logic unit for decoding the register information for fetching and the interface of another processing unit in order to handle a wide variety of data processing. For example, in the case where matrix calculation process is performed for a fixed time and filtering process is preformed thereafter, connection between the processing units within the data processing system for these processes are provided prior to the each process, and the each process is performed sequentially by the time counter. Replacing the time counter with another comparison circuit or external event detector enables more complicated and flexible scheduling becomes possible.

The FPGA architecture may be employed in individual processing units. However, it takes a long time to dynamically change the hardware, and additional hardware for reducing that time is required. This makes it difficult to dynamically control the hardware within the processing unit during execution of the application. Should a plurality of RAM be provided with a bank structure for instantaneous switching, switching on the order of several to several tens of clocks would require a considerable number of bank structures. Thus, it is basically required to make each of the macro cells within the FPGA independently programmable and detectable the time or timing for changing as a program-based control machine. However, the current FPGA is not enough to deal with such a structure. Should the FPGA be capable of deal with that structure, new instruction control architecture as in the present invention is required for controlling the timing dynamically.

Accordingly, in the present invention, it is desirable to employ as the processing unit a circuit unit including a specific internal data path. By the processing units having somewhat compact data paths prepared as templates and combination of the data paths of the templates, the data-flow-type processing is designated and performed. In addition, a part of the internal data path of the processing unit becomes selectable according to the preparation information or preparation instruction, the processing content of the processing unit becomes changeable. As a result, the hardware can be more flexibly reconfigured in a short time.

A processing unit provided with an appropriate logic gate or logic gates and internal data paths connecting the logic gate or gates with input/output interfaces is hereinafter referred to as a template since the specific data path provided in that processing unit is used like a template. Namely, in the processing unit, it becomes possible to change the process of the processing unit by changing the order of data to be input/output to the logic gates or changing connection between or selection of the logic gates. It is only necessary to select a part of the internal data path that is prepared in advance. Therefore, the processing can be changed in a shorter time as compared to the FPGA that requires change of the circuitry at the transistor level. Moreover, the use of the previously arranged internal data path for the specific purpose reduces the number of redundant circuit elements and increases the area utilization efficiency of the transistors. Accordingly, the mounting density becomes high, which leads economical production. Moreover, arranging the data path suitable for high-speed processing, an excellent AC characteristic is obtained. Therefore, in the present invention, it is desirable that in the second execution control unit and the second control step, at least a part of the internal data path of the processing unit becomes selectable according to the preparation information.

It is also desirable that the second execution control unit has a function as a scheduler for managing an interface of the processing unit so as to manage a schedule retaining the interface of each processing unit that is set based on the preparation information.

Moreover, it is desirable that input and/or output interfaces in a processing block formed from a plurality of processing units are designated according to the preparation information. Since the interfaces of the plurality of processing units are changed with a single instruction, data paths associated with the plurality of processing units are changed with a single instruction. Accordingly, it is desirable that in the second execution control unit or step, input and/or output interfaces of the processing units are changeable in the unit of the processing block according to the preparation information.

Moreover, it is desirable to provide a memory storing a plurality of configuration data defining the input and/or output interfaces in the processing block, and to enable the input and/or output interfaces in the processing block to be changed by selecting one of the plurality of configuration data stored in the memory according to the preparation information. When the configuration data is designated with a data flow defining instruction, changing of the interfaces of the plurality of processing units are controlled from a program without using the redundant instruction.

Furthermore, the data processing system having a first control unit suitable for general-purpose processing, such as the arithmetic/logic unit, as a processing unit, and a second control unit suitable for special processing such as a plurality of data flow processing units having a specific internal data path, becomes a system LSI that is suitable for processing requiring high-speed performance and real-time performance like network processing and image processing. In the instruction set of the present invention, the execution instruction for operating the arithmetic/logic unit is described in the first field, and the preparation information defining an interface of the arithmetic/logic unit and/or the data flow processing units is described in the second field. Therefore, by the instruction set of the present invention, the program product suitable for controlling the aforementioned system LSI is provided.

Conventionally, the only way to handle with complicated data processing is to prepare dedicated circuitry and implement a dedicated instruction using that circuitry, thereby increasing the hardware costs. In contrast, in the instruction set of the present invention, the interface of the arithmetic/logic unit and the contents of processings to be executed are described in the second field independently of the execution instruction, thereby making it possible to include the composition for controlling pipelines and/or controlling data paths into the instruction set. Accordingly, the present invention provides means that is effective in execution of parallel processing near a program counter, but also in para-simultaneous execution of two or more objects and para-simultaneous execution of two or more functions. In other words, data processes and/or algorithm having different contexts are not performed simultaneously in the conventional instruction since it is required to simultaneous processing according to remote program counters pointing far beyond points each other. In contrast, by appropriately defining data flows with the instruction sets of the present invention, such processes are preformed regardless of the program counters.

Accordingly, with the instruction sets of the present invention, when the data paths are effective in improvement in parallel processing performance from the application side previously, such data paths are configured or arranged previously using the second field by the software. Then, the data paths (data flows) implemented are activated or executed using the instruction level as required by the software. The data paths are applied not only for the data processing corresponding to some specific purposes but also for a purpose for activating state machines, therefore, the applications of the data paths are extremely free.

Moreover, the information in the second field allows a preparation cycle for the following instruction to be readily generated in advance. Conventionally, an operation must be performed using registers. However, buffering by the preparation cycle makes it possible to use memories (single port/dual port) or register files instead of the register. In the second field of the instruction set, the instructions designating input/output between registers or between buffers and memories that are included in the processing unit can be described. Therefore, when the input/output between the registers or between buffer and the memories are controlled in the second execution control unit or the second control step, the input/output or to/from the memories are performed independently of the execution instruction.

This enhances relevance between individual instruction sequences, and contributes to avoiding hardware resource contention prior to the execution, thereby making it possible to quick correspondence to the parallel simultaneous execution requirements of a plurality of instructions and/or external interrupt requirements. In addition, since the memory can basically be regarded as a register, high-speed task switching can be implemented. It is also possible to employ a preloading-type high-speed buffer instead of a cache memory that cannot eliminate conventional first-fetch penalty. Therefore, a high-speed embedded system producing no penalty while ensuring a 100% hit ratio can also be implemented.

In other words, by allowing the memory to be regarded as a register, a plurality of asynchronous processing requests such as interrupts can be handled at a high speed, thereby making it possible to deal with the complicated data processing and continuous data processing in an extremely flexible manner. Moreover, since it does not take a long time to store and recover the register, it becomes very easy to deal with the task switching at a high speed. In addition, since the difference in access speed between the external memories and internal memories is completely eliminated, the first-fetch penalty problem in the cache memories becomes solved efficiently. Accordingly, CALL/RET and interrupt/IRET can be processed at a high speed. Thus, environments for responding to the event configured easily and reduction in data processing performance due to the event can be prevented.

Moreover, in the first or second field, it is possible to describe a plurality of execution instructions or preparation instructions like VLIW, and it is possible that the first or second execution control unit include a plurality of execution control portions for independently processing the plurality of independent execution instructions or preparation instructions that are described in the first or second field respectively. Thus, further improved performance can be obtained.

By implementing a data processing system that employs the control unit of the present invention as a core or peripheral circuitry, it is possible to provide a further economical data processing system having the advantages as described above and having a high processing speed.

DESCRIPTION OF THE PREFERRED EMBODIMENT

Figure 1:
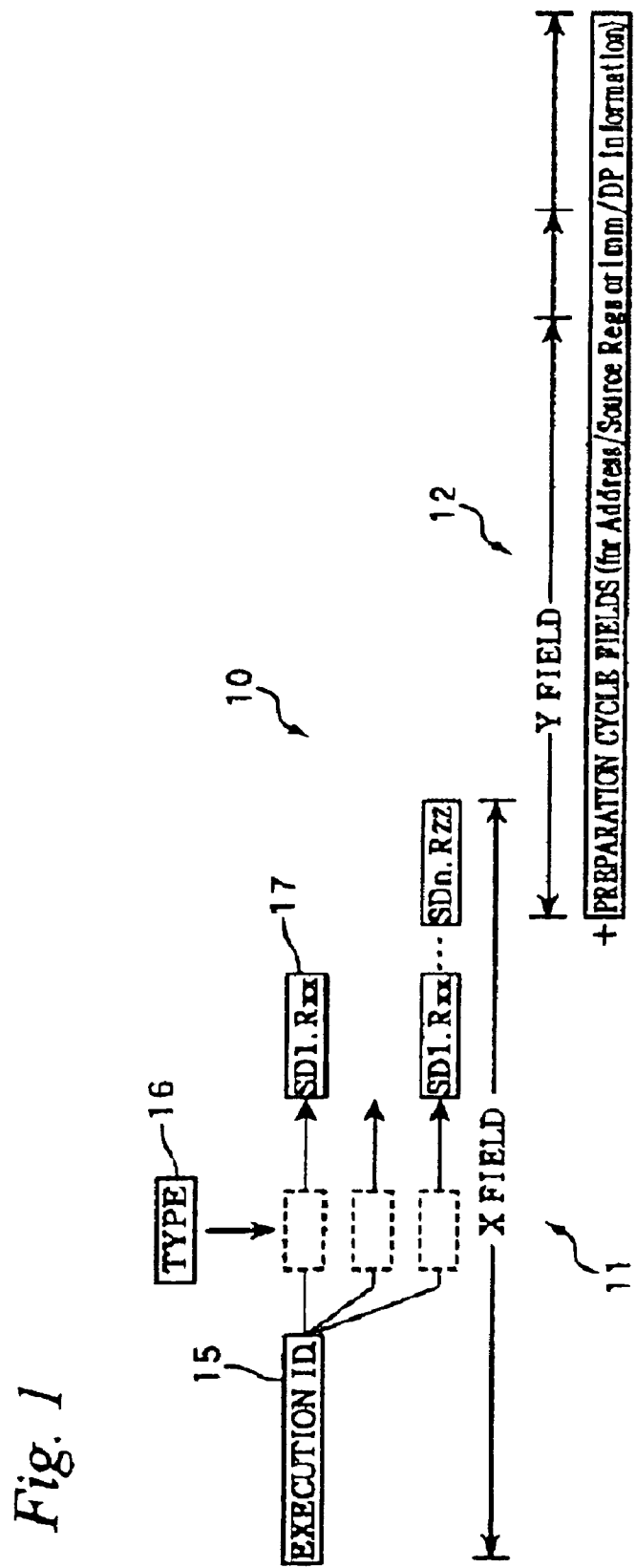
FIG. 1 illustrates an instruction set of the present invention.

Hereinafter, the present invention will be described in more detail with reference to the drawings. FIG. 1 shows the structure or format of the instruction set (instruction format) according to the present invention. The instruction set (instruction set of DAP/DNA) 10 in the present invention includes two fields: a first field called instruction execution basic field (X field) 11 and a second field called instruction execution preparation cycle field (additional field or Y field) 12 capable of improving efficiency of the subsequent instruction execution. The instruction execution basic field (X field) 11 specifies a data operation such as addition/subtraction, OR operation, AND operation and comparison, as well as the contents of various other data processings such as branching, and designates a location (destination) where the operation result is to be stored. Moreover, in order to improve the utilization efficiency of the instruction length, the X field 11 includes only information of the instructions for execution. On the other hand, the additional field (Y field) 12 is capable of describing an instruction or instructions (information) independent of the execution instruction in the X field of the same instruction set, and for example, is assigned for the information for execution preparation cycle of the subsequent instruction.

The instruction set 10 will be described in more detail. The X field 11 has an execution instruction field 15 describing the instruction operation or execution instruction (Execution ID) to a processing unit such as arithmetic/logic unit, a field (type field) 16 indicating valid/invalid of the Y field 12 and the type of preparation instruction (preparation information) indicated in the Y field 12, and a field 17 showing a destination register. As described above, the description of the type field 16 is associated with the Y field 12 and can be defined independently of the descriptions of the other fields in the X field 11.

Figure 2:
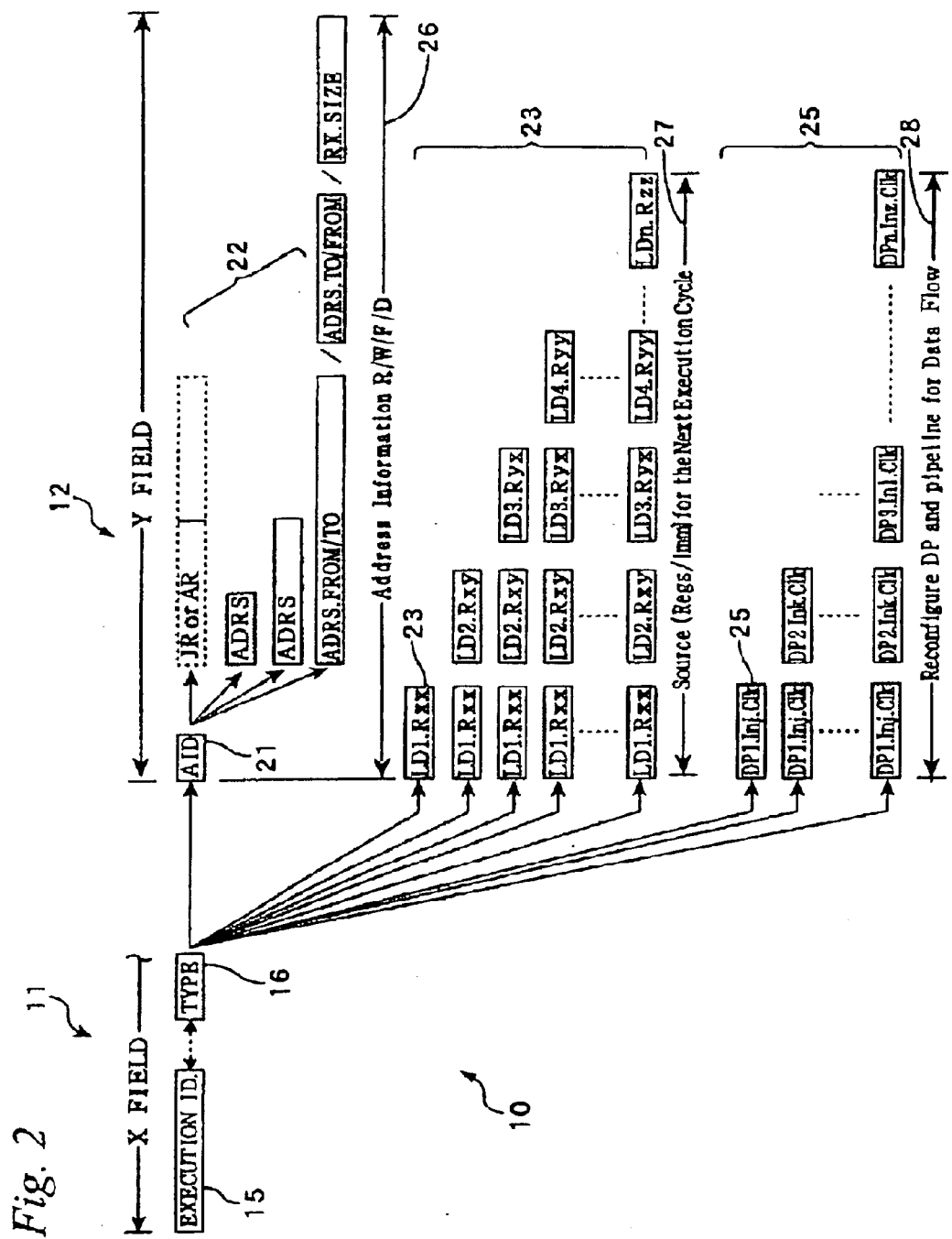
FIG. 2 illustrates in more detail a Y field of the instruction set of FIG. 1.

In the Y field 12, the preparation information defined by the type field 16 is described. The preparation information described in the Y field 12 are information for making an operation or other data processing ready for execution. Some specific examples thereof are shown in FIG. 2. First, it is noted again that the TYPE field 16 in the X field 11 is for describing information independently or regardless of the information in the execution instruction field 15. In the Y field 12, it is possible to describe an address information field 26 that describes an address ID (AID) 21 and address information 22 which intended use is defined by AID 21, e.g., an address (ADRS) and an input/output address (ADRS.FROM/TO). This address information described in the Y field 12 is used for reading and writing between registers or buffers and memories (including register files), and block transferring like DMA becomes ready by the information in the Y field. In addition to the input/output address (R/W), it is also possible to describe the information such as an address indicating a branch destination upon execution of a branch instruction (fetch address, F) and a start address (D) upon parallel execution in the Y field 12 as address information.

In the Y field, it is also possible to describe information 23 that defines an instruction of a register type, e.g., defined immediate (imm) and/or information of registers (Reg) serving as source registers for the arithmetic operation or another logic operation instruction (including MOVE, memory read/write, and the like). In other words, it is possible to use the Y field 12 as a field 27 that defines sources for the subsequent execution instruction.

Furthermore, in the Y field 12, it is possible to describe information 25 defines interfaces (source, destination) and processing content or function and/or their combination of an arithmetic/logic unit (ALU) or other data processing unit, e.g., a template having data path(s) being ready to use. In other words, the Y field 12 is utilized as a field 28 for describing data flow designation instructions 25 for defining reconfigure data paths to be pipelines (data flows or data paths) for conducting a specific data processing. It is also possible to describe information for starting or executing the data flow and information for terminating the same in the Y field 12. Accordingly, the data flows provided with reconfigurable data paths defined by the Y field 12 enables execution of processes independently of a program counter for fetching a code from a code RAM.

It should be understood that the format of the instruction set as shown in FIGS. 1 and 2 is only one of examples of instruction set having two independent instruction fields according to the present invention, and the present invention is not limited to the format shown in FIGS. 1 and 2. For example, the positions of the some fields in the X and Y fields are not limited. The position of the independent field, e.g., type field 16 may alternatively be located at the head of the Y field 12. It is also possible to change the order of the X field 11 and Y field 12. In this example, since the information of the Y field 12 is included in the X field 11, whether or not preparation information is present in the Y field 12 as well as the type of the preparation information are judged when the X field 11 for describing the execution instruction is decoded.

In the example described below, the execution instruction and preparation instruction are described in the X field 11 and Y field 12 respectively. However, by the instruction format, it is possible to provide an instruction set that no instruction is described (NOP is described) in the X or Y fields and only the X field 11 or Y field 12 is effective actually. Another instruction set is also possible by the above instruction format that such a preparation instruction having operands such as register information relating to an execution instruction described in the X field 11, i.e., the preparation instruction that is not independent of the execution instruction in the X field 11, is simultaneously described in the Y field 12 of the same instruction set 10. This instruction set may be included mixedly in the same programs with the instruction sets of the present invention in which the X field 11 and Y field 12 are independent of each other and have no relation to each other within the same instruction set. A specific example is not described below for clarity of description of the invention, however, a program product having both the instruction sets 10 in which the respective description in the X field 11 and Y field 12 are independent of each other and the instruction sets in which the respective description in the X field 11 and Y field 12 are associated with each other, a recording medium recording such a program are also within the scope of the present invention.

Figure 3:
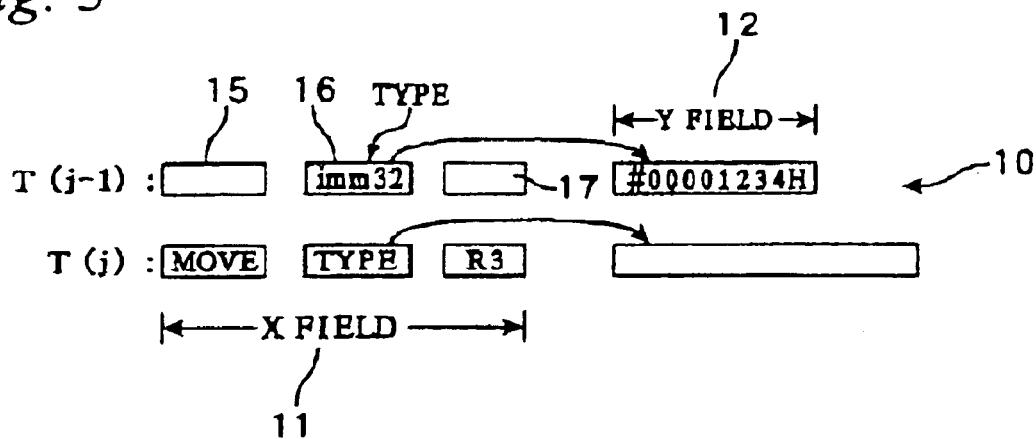
FIG. 3 illustrates one example using the instruction set of FIG. 1.

FIG. 3 shows an example of the instruction set 10 of this invention. In the number j−1 instruction set 10, T(j−1), the type field 16 of the X field 11 indicates that 32-bit immediate is described in the Y field 12 of the same instruction set. "#00001234H" is recorded as immediate in the Y field 12 of the instruction set T(j−1). In the following number j instruction set T0), "MOVE" is described in the execution instruction field 15 of the X field 11, and register R3 is indicated in the destination field 17. Accordingly, when this number j instruction set T(j) is fetched, an ALU of a control unit stores, in the register R3, the immediate "#00001234H" defined in the preceding instruction set T(j−1).

Thus, in the instruction set 10 of this embodiment (hereinafter, the number j instruction set 10 is referred to as instruction set T(j)), preparation for the execution instruction described in the instruction set T(j)) is made by means of the preceding instruction set T(j−1). Accordingly, the whole of processing to be executed by the ALU of the control unit cannot be known from the instruction set T(j) alone, but is uniquely determined from the two instruction sets T(j−1) and T(j). Moreover, in the execution instruction field 15 of the instruction set T(j−1), another execution instruction for another process prepared by the Y field 12 of the preceding instruction set is described independently of the Y field 12 of the instruction set T(j−1). Furthermore, in the T(j) field 16 and Y field 12 of the instruction set T(j), another preparation information of another execution instruction described in the execution instruction field of the following instruction set is described.

In this embodiment, preparation information (preparation instruction) of the execution instruction described in the X field 11 of the instruction set T(j) is described in the Y field 12 of the immediately preceding instruction set T(j−1). In other words, in this example, preparation instruction latency corresponds to one clock. However, preparation information may be described in another instruction set prior to the immediately preceding instruction set. For example, in a control program of the control unit having a plurality of ALUs, or for data flow control as described below, the preparation instruction need not be described in the immediately preceding instruction set. Provided that the state (environment or interface) of ALUs or the configuration of templates set by preparation instructions are held or kept until the instruction set having the execution instruction corresponding to that preparation instruction is fetched for execution, the preparation instruction can be described in the Y field 12 of the instruction set 10 that is preformed several instructions cycle before the instruction set 10 having the execution instruction corresponding to the preparation instruction.

Figure 4:
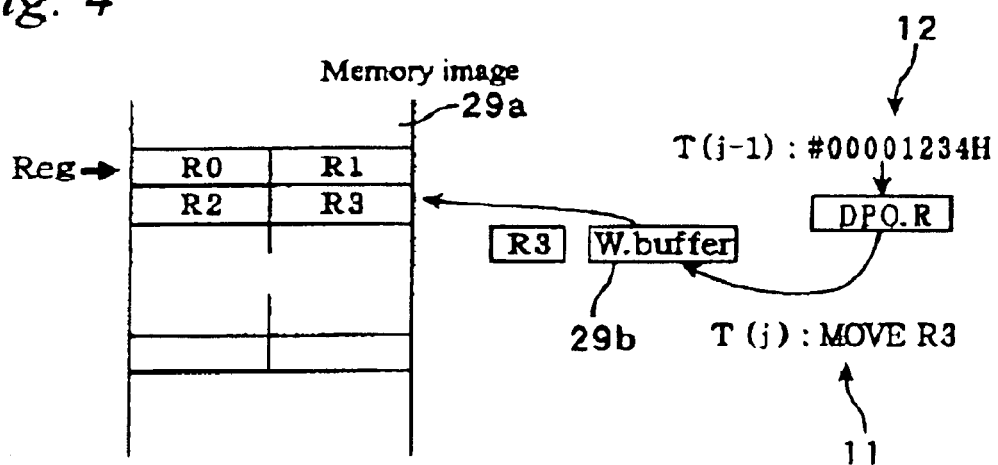
FIG. 4 illustrates how data are stored in a register by the instruction set of FIG. 3.

FIG. 4 shows the state where a data item is stored according to the instruction set of FIG. 3 in a register file or memory that functions as registers. A processor fetches the number j−1 instruction set T(j−1), and the immediate "#00001234H" is latched in a source register DP0.R of the ALU of the processor according to the preparation instruction in the Y field 12 thereof. Then, the processor fetches the following number j instruction set T(j), and the immediate thus latched is stored in a buffer 29b in the execution cycle of the execution instruction "MOVE" in the X field 11. Thereafter, the data item in the buffer 29b is saved at the address corresponding to the register R3 of the memory or the register file 29a. Even if the storage destination is not registers but memories, by the instruction set 10 of this embodiment enables the data to be loaded or stored in the execution instruction cycle by conducting the process according to the preparation information prior to the execution instruction.

Figure 5:
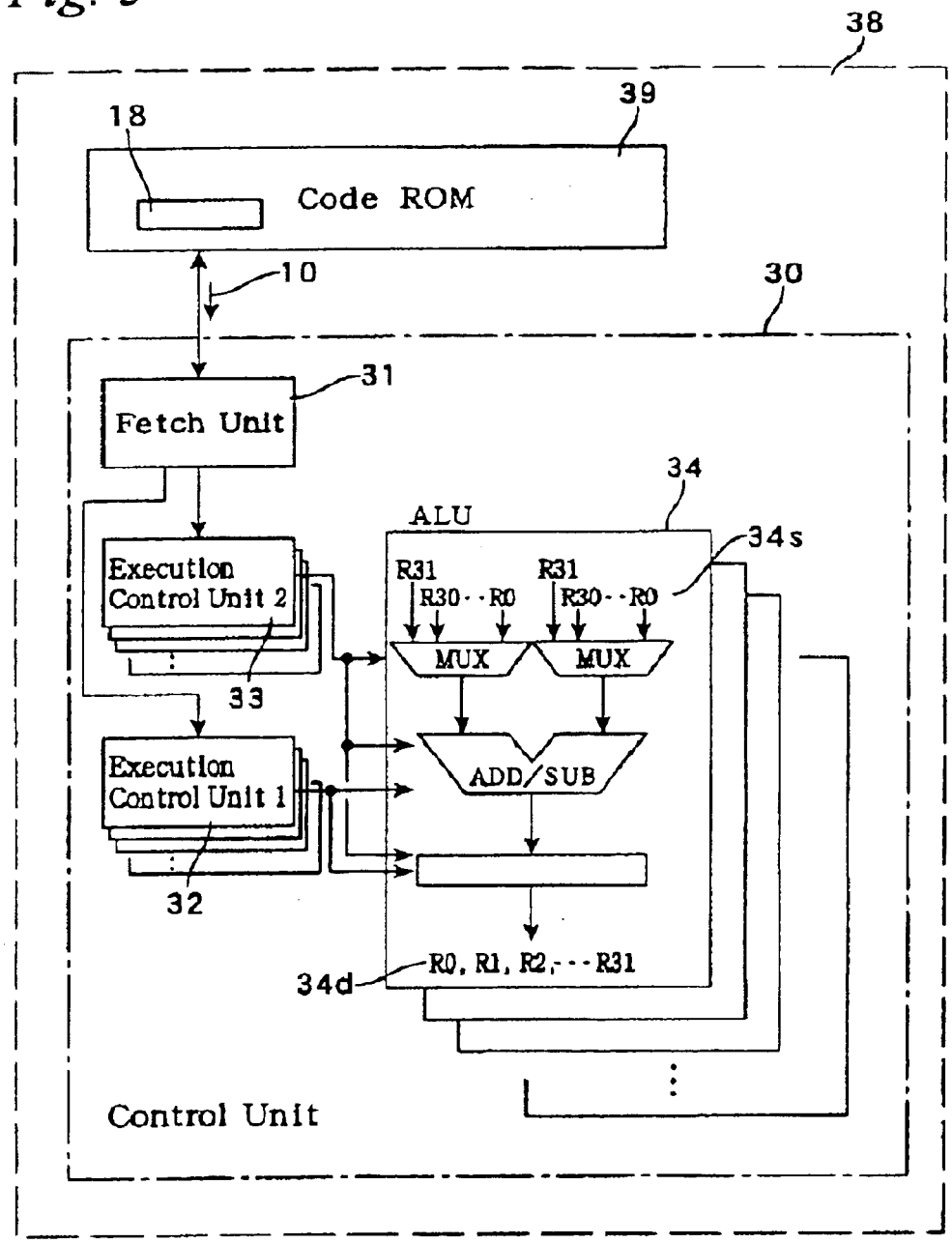
FIG. 5 illustrates a data processing system for executing the instruction set of the present invention.

FIG. 5 shows the schematic structure of a processor (data processing system) 38 having a control unit 30 capable of executing a program having the instruction sets 10 of this embodiment. Microcodes or microprograms 18 having the instruction sets 10 of this embodiment are saved in a code ROM 39. The control unit 30 includes a fetch unit 31 for fetching an instruction set 10 of the microprogram from the code ROM 39 according to a program counter whenever necessary, and a first execution control unit 32 having a function to decode the X field 11 of the fetched instruction set 10 so as to determine or assert the function of the ALU 34, and to select destination registers 34d so as to latch the logic operation result of the ALU 34 therein.

The control unit 30 further includes a second execution control unit 33 having a function to decode the Y field 12 of the fetched instruction set 10 based on the information in the type field 16 of the X field 11 and to select source registers 34s of the arithmetic processing unit (ALU) 34. This second execution control unit 33 is capable of interpreting the instruction or information in the Y field 12 independently of the description of the X field 11, except for the information in the type field 16. If the information described in the Y field 12 defines data flows, the second execution control unit 33 further has a function to select or set the source and destination sides of the ALU 34, i.e., determine the interface of the ALU 34, and to retain that state continuously until a predetermined clock or until a cancel instruction is given. Moreover, in the case where the information in the Y field 12 defines data flows, the second execution control unit 33 further determines the function (processing content) of the ALU 34 and retains that state for a predetermined period.

Accordingly, the first execution control unit 32 conducts a first control step of decoding the execution instruction in the X field 11 and proceeding with the operation or other data processes according to that execution instruction by the processing unit that is preset so as to be ready to execute the operation or other data processes of that execution instruction. On the other hand, independently of the content of the execution of the first execution control unit 32 and the first control step conducted thereby, the second execution control unit 33 performs a second control step of decoding preparation information in the Y field 12 and setting the state of the processing unit so as to be ready to execute the operation or other data processing.

This control unit 30 further includes a plurality of combinations of such execution control units 32, 33 and ALUs 34, making it possible to execute various processes. As a result, a DSP for high-speed image data processing, a general CPU or MPU capable of high-speed digital processing, and the like, can be configured using the control unit 30 as a core or peripheral circuitry.

Figure 6:
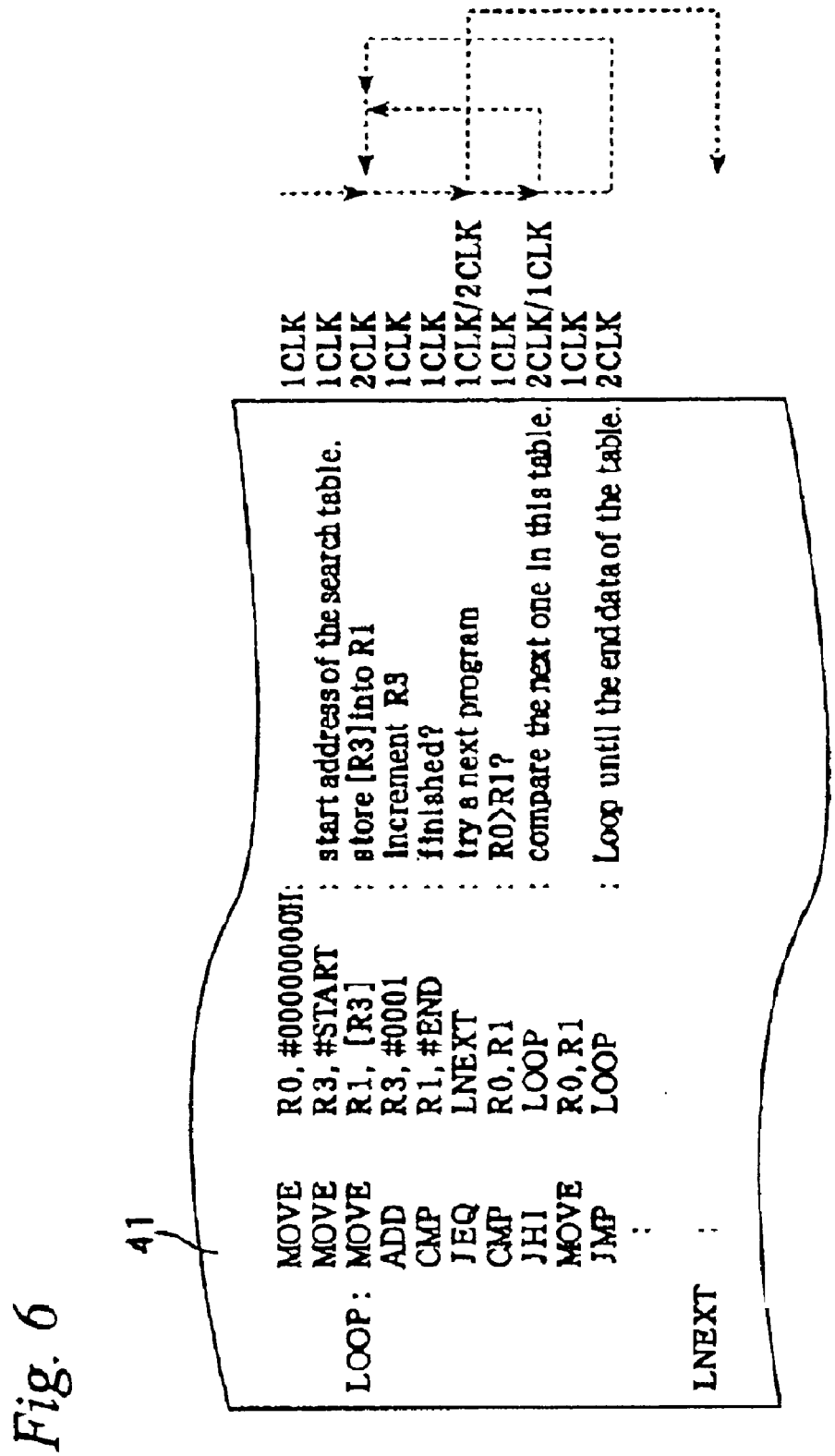
FIG. 6 illustrates a program executed with a conventional CPU or DSP.

FIGS. 6 to 9 shows some sample programs executed by the control unit 30 of this embodiment. A sample program 41 shown in FIG. 6 is an example created so as to be executable by a conventional CPU or DSP. This program extracts the maximum value from a table starting with an address #START and is terminated upon detection of #END indicating the last data.

Figure 7:
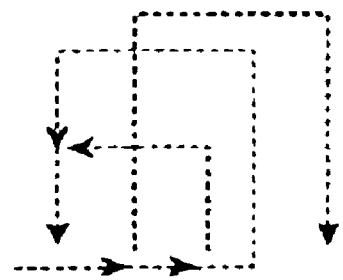
FIG. 7 illustrates a program of the data processing system according to the present invention.

A program 42 shown in FIG. 7 corresponds to the same procedure as that of FIG. 6, the program is converted to the one suitable for the control unit 30 for executing the instruction sets of the present invention. The program 42 is generated for executing two instructions with a single instruction set. The program shown in FIG. 7 is converted through a compiler into an execution program of the instruction sets of the present invention so as to be executed by the control unit 30.

Figure 8:
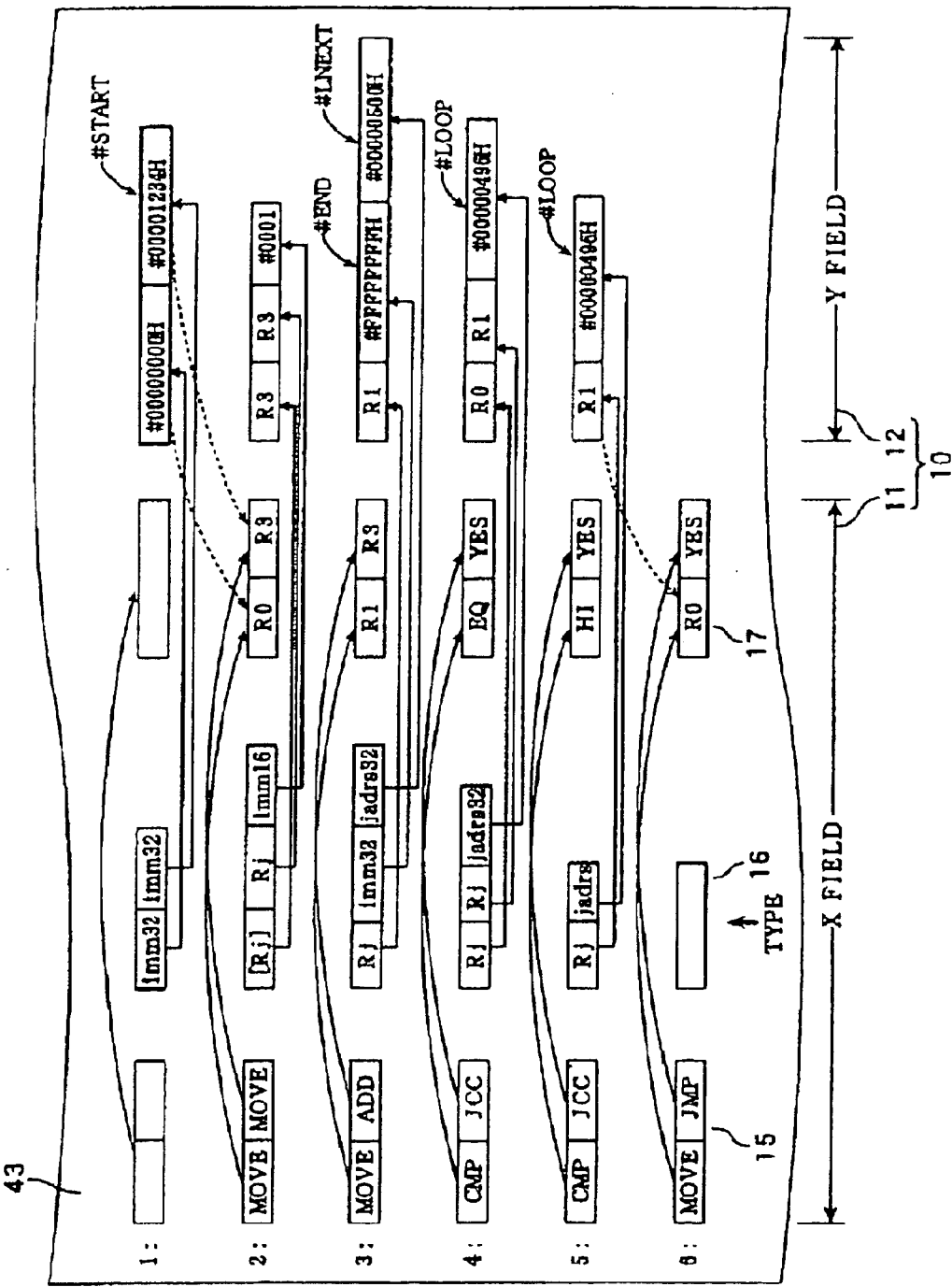
FIG. 8 illustrates compiled program of the program of FIG. 7 using instruction sets of the present invention.

FIG. 8 shows the complied program 43 having instruction sets 10 of the present invention. The program product 18 having such instruction sets 10 is provided in the form recorded or stored in the ROM 39, RAM, or another appropriate recording medium readable by the data processing system. Moreover, the program product 43 or 18 embedded in a transmission medium exchangeable in a network environment may also be distributed. It is well understood in the programs 43 with reference to the program 42, preparation for the execution instructions 15 of the second instruction set 10 is made in the Y field 12 of the first instruction set 10. In the first instruction set 10, the type field 16 indicates that immediate is described in the Y field 12 as preparation information. The second execution control unit 23 decodes the Y field 12 and provides the immediate to source caches or registers of the ALU 34. Therefore, by the second instruction set 10, the execution instructions 15 are executed on the ALU 34 that has been ready for those execution instructions. Namely, at the time when the second instruction set 10 is executed, to the registers defined in the destination field 17, the instructions of "MOVE" in the execution instruction field 15 are simply executed.

Similarly, in the Y field 12 of the second instruction set 10, instructions to set source registers are described as preparation information of the execution instructions "MOVE" and "ADD" in the execution instruction field 15 of the following third instruction set 10. The type field 16 defines that the registers and immediate are described in the Y field 12.

In the program 43, the third and the following instruction sets 10 are decoded as that described above. Preparation information for the execution instructions 15 of the following fourth instruction set 10 is described in the type field 16 and Y field 12 of the third instruction set 10. The execution instructions 15 of the fourth instruction set 10 are comparison (CMP) and conditional branching (JCC). Accordingly, by the type field 16 and Y field 12 of the third instruction set 10, a register R1 to be compared in the following execution instruction 15, an immediate data of #END (#FEFFFFFFH), and an address of the branch destination #LNEXT (#00000500H) are described as preparation information. Accordingly, upon executing the execution instructions 15 of the fourth instruction set 10, the comparison result is obtained in that execution cycle, because the input data have been set to the arithmetic-processing unit 34 that operates as a comparison circuit. Moreover, the jump address has been set to the fetch address register. Therefore, by the conditional branching of the execution instruction 15, another instruction set 10 at the transition address is fetched in that execution cycle, based on the comparison result.

By the type field 16 and Y field 12 of the fourth instruction set 10, information on registers to be compared (R0 and R1) and an address of the branch destination #LOOP (#00000496H) are described as preparation information of the execution instructions 15 of the following fifth instruction set 10, i.e., comparison (CMP) and conditional branching (JCC). Accordingly, like the fourth instruction set, upon executing the fifth instruction set 10, the comparison and conditional branching are performed at that execution cycle, because the interface of the arithmetic processing unit 34 has already been ready to execute the CMP and JCC described in the X field 11.

In the Y field 12 of the fifth instruction set 10, source register information (R1) and an address of the transition destination #LOOP are described as preparation information of the execution instructions of the following sixth instruction set 10, i.e., movement (MOVE) and branching (JMP). Accordingly, when the sixth instruction set 10 is executed, the data item is stored in the destination register R0 as well as another instruction is fetched from the address of the transition destination #LOOP in that execution cycle.

Thus, according to the instruction set of the present invention, the execution instruction is separated from the preparation instruction that describes interfaces and/or other information for executing subject execution instruction. Moreover, the preparation instruction is described in the instruction set that is fetched prior to that execution instruction. Accordingly, by the execution instructions described in each instruction set, only the execution corresponding arithmetic operation is simply or merely executed, because the data have been read or assigned to the source sides of the ALU 34. Accordingly, excellent AC characteristics and improved execution frequency characteristics are obtained. Moreover, like the conventional pipeline, although the timings of operations with respect to the execution instruction are different from that of the conventional pipeline, operations such as instruction fetching, register decoding, and other processings are performed in a stepwise manner. Thus, the throughput is also improved.

In addition, the program of this embodiment is capable of describing two instructions in a single instruction set. Therefore, by parallel execution of a plurality of instructions near the program counter like VLIW, the processing speed becomes further improved.

Moreover, in this program 43, conditional branching is described in the execution instruction field 15 of the fourth instruction set, and the address of subject branch destination is described in the Y field 12 of the preceding third instruction set. Accordingly, the address of the branch destination is set to the fetch register upon or before execution of the fourth instruction set. Thus, when the branch conditions are satisfied, the instruction set at the branch destination is fetched and/or executed without any penalty. It is also possible to pre-fetch the instruction at the branch destination, so that preparation for executing the execution instruction at the branch destination can be made in advance. Accordingly, even the instruction at the branch destination is executed without loss of even one clock. Thus, the processing is accurately defined on a clock-by-clock basis.

Figure 9:
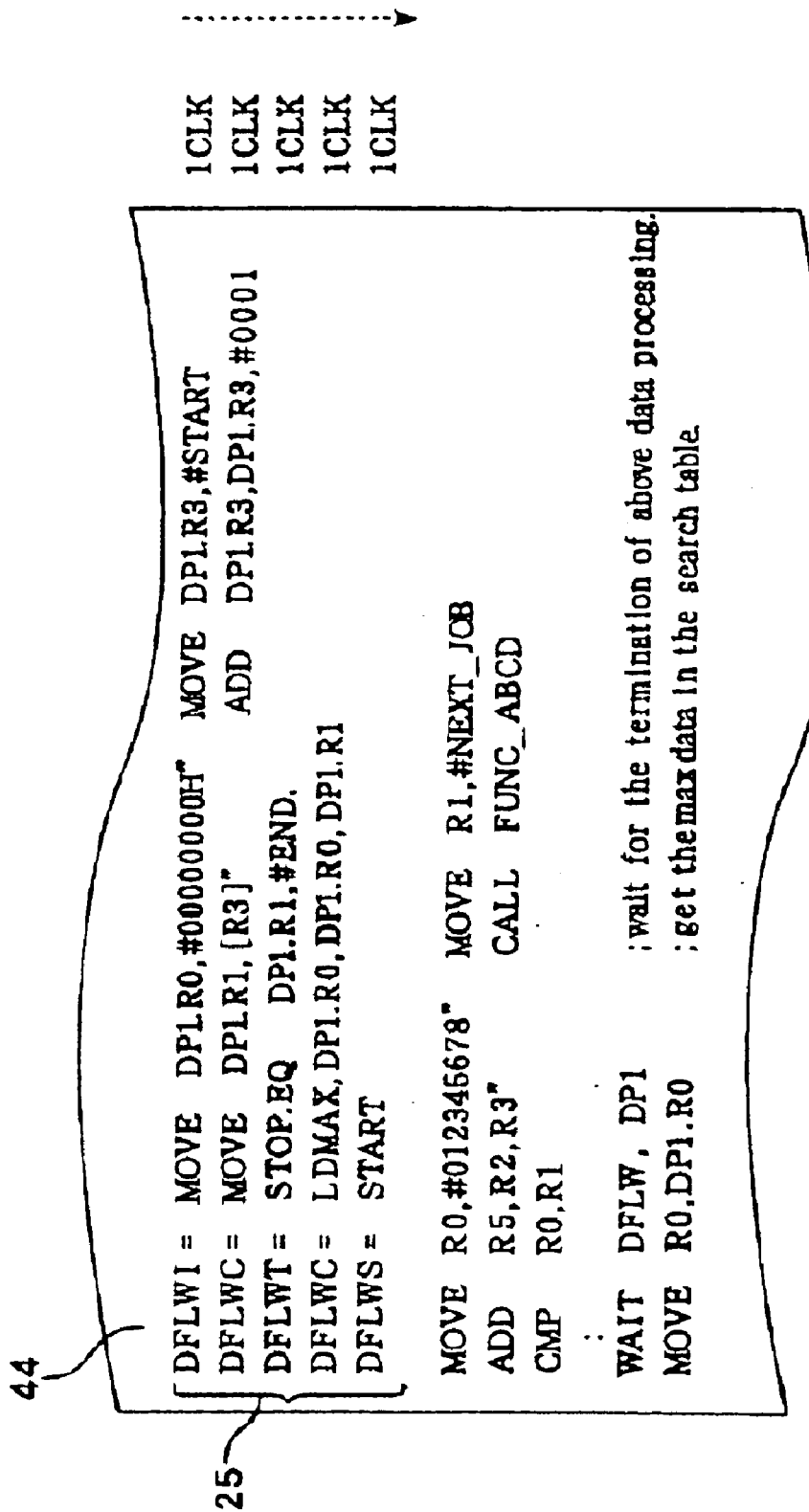
FIG. 9 illustrates another program of the data processing system according to the present invention.

FIG. 9 further shows a program 44 of the present invention, which defines data flows using the Y field 12 of the instruction set 10 of the present invention for executing the same procedure described above based on that data flows. Among the data flow designation instructions 25 described in this program 44, "DFLWI" is an instruction for initializing a data flow, and "DFLWC" is an instruction defining information of connections (information of interfaces) and processing content (function) of the arithmetic processing unit 34 forming the data flow (data path). "DFLWS" is an instruction defining the termination conditions of the data flow. Instruction located the end, "DFLWS" is for inputting data to the data flow thus defined and actuate the processing of the data path. These data flow designation instructions 25 are described in the Y field 12 as preparation information and decoded by the second execution control unit 33, so that the structures (configurations) for conducting the data processes are set by the processing units 34.

When the program 44 shown in FIG. 9 is executed, the second execution control unit 33 sets, as the second control step, the input and/or output interfaces of the processing unit independently of the time or timing of execution of that processing unit, as well as defines the contents of the processing to be executed in the processing unit according to the specification of data flow in the program. Moreover, the second execution control unit 33 also functions as a scheduler 36 so as to manage the schedule retaining the interface of respective processing unit in the second control step.

Figure 10:
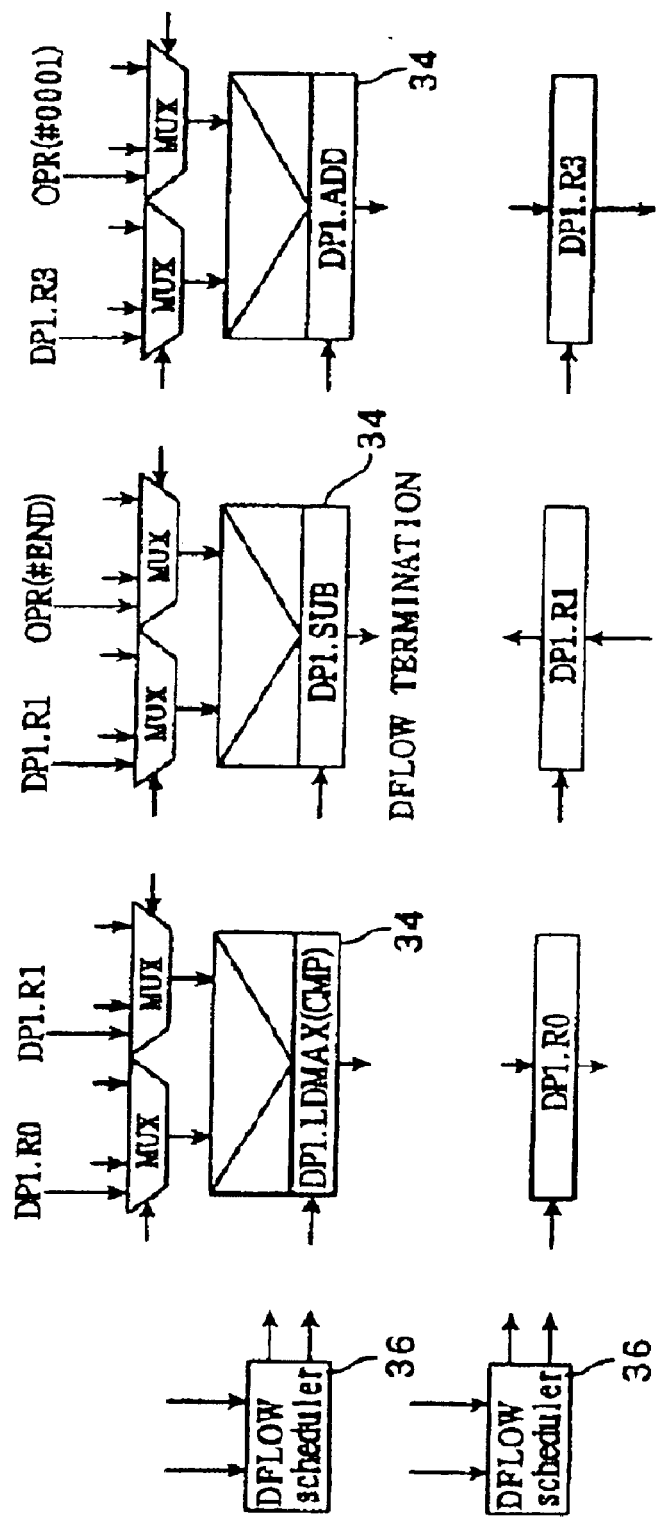
FIG. 10 illustrates data flows configured by the program of FIG. 9.

Accordingly, as shown in FIG. 10, the second execution control unit 33 functioning as scheduler 36 defines the respective interfaces (input/output) and contents or functions of the processing of three arithmetic processing units 34, and retains that states and/or configurations until the termination conditions are satisfied. Accordingly, through the data flow or data path configured with these arithmetic processing units 34, the same processing as that shown in FIG. 6 proceeds in sequence independently of the program counter. In other words, by designating the data flow, dedicated circuitry for that processing is provided in the control unit 30 prior to the execution by the three arithmetic processing units 34. Thus, the processing of obtaining the maximum value is executed independently of the control of the program counter. The data flow is terminated if the ALU 34 functioning as DP1.SUB judges that DP1.R1 corresponds to #END.

Thus, as is shown in FIG. 9, definition of the data flow enables the same processing as that of the program shown in FIG. 6 or 7 without using any branch instruction. Accordingly, although the control unit 30 is for a general-purpose, it efficiently performs a specific processing efficiently and at an extremely high speed like a control unit having dedicated circuitry for that specific processing.

The instruction set and the control unit according to the present invention make it possible to provide data flows or para-data flows for various processings in the control unit. These data flows can also be applied as templates for executing other processings or programs. This means that, using software, the hardware are modified at any time to the configuration suitable for the specific data processing, in addition, such configurations are realized by other programs or hardware. It is also possible to set a plurality of data flows, and a multi-command stream can be defined in the control unit by software. This significantly facilitates parallel execution of a plurality of processings, and programming easily controls varieties of their execution.

Figure 11:
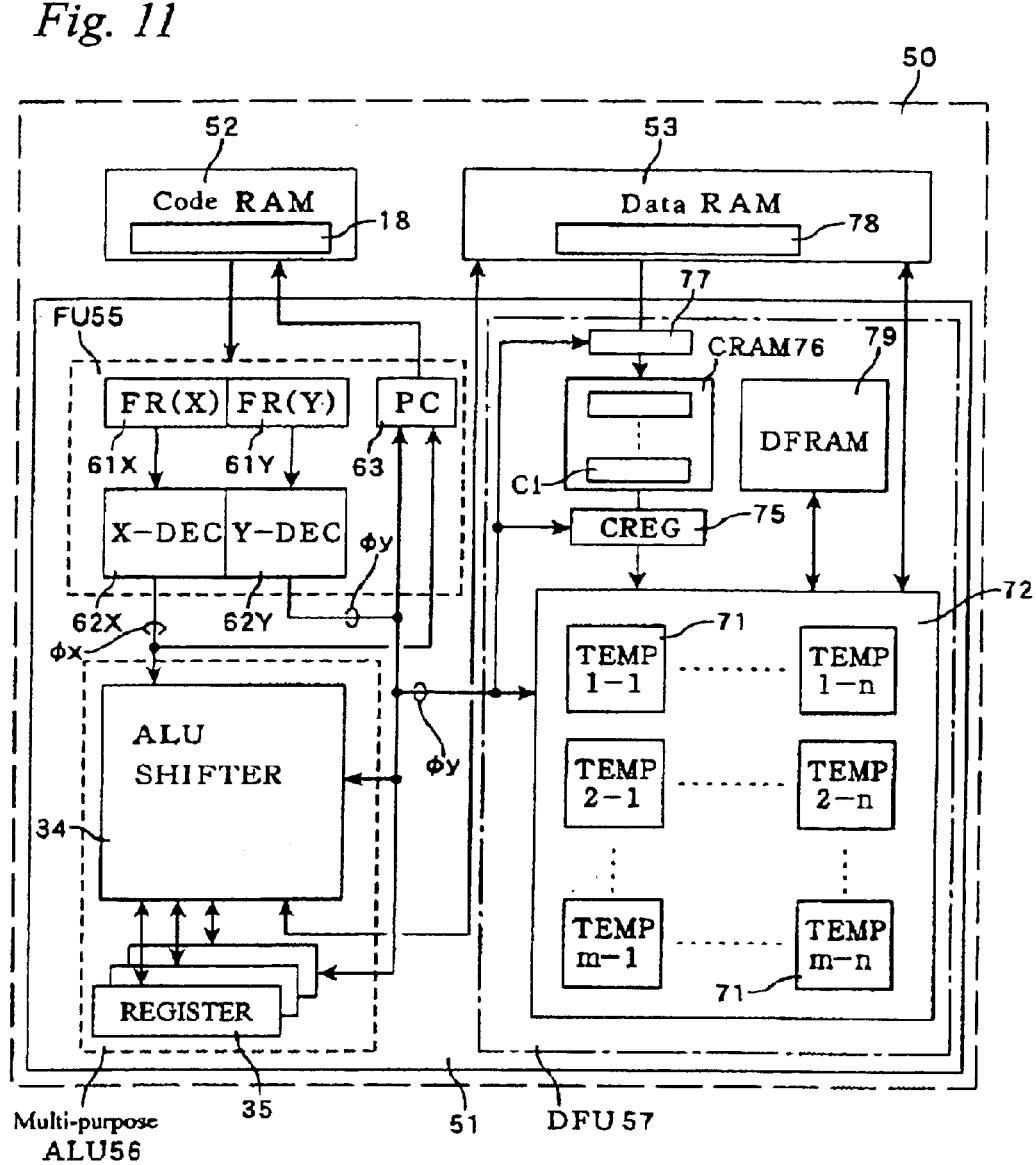
FIG. 11 illustrates another data processing system for executing data processes by the instruction sets of the present invention.

FIG. 11 is a schematic structure of a data processing system provided as a system LSI 50, having a plurality of processing units (templates) capable of defining a data flow by the instruction set 10 including the X field 11 and Y field 12 of this invention. This system LSI 50 includes a processor section 51 for conducting data processings, a code RAM 52 storing a program 18 for controlling the processings in the processor region 51, and a data RAM 53 storing other control information or data of processing and the RAM 53 becomes a temporal work memory. The processor section 51 includes a fetch unit (FU) 55 for fetching a program code, a general-purpose data processing unit (multi-purpose ALU, first control unit) 56 for conducting versatile processing, a data flow processing unit (DFU, second control unit) 57 capable of processing data in a data flow scheme.

The LSI 50 of this embodiment decodes the program code that includes a set of X field 11 and Y field 12 in the single instruction set 10 and executes the processing accordingly. The FU 55 includes a fetch register (FR(X)) 61x for storing instruction in the X field 11 of the fetched instruction set 10, and a fetch register (FR(Y)) 61y for storing instruction in the Y field 12 thereof. The FU 55 further includes an X decoder 62x for decoding the instruction latched in the FR(X) 61x, and a Y decoder 62y for decoding the instruction latched in the FR(Y) 61y. The FU 55 further includes a register (PC) 63 for storing an address of the following instruction set according to the decode result of these decoders 62x and 62y, and the PC 63 functions as a program counter. The subsequent instruction set is fetched at any time from a predetermined address of the program stored in the code RAM 52.

In this LSI 50, the X decoder 62x functions as the aforementioned first execution control unit 32. Therefore, the X decoder 62x conducts the first control step of the present invention, based on the execution instruction described in the X field 11 of the instruction set 10. They decoder 62y functions as the second execution control unit 33. Accordingly, the Y decoder 62y performs the second control step of the present invention, based on the preparation information described in the Y field 12 of the instruction set 10. Therefore, in the control of this data processing system, in the fetch unit 55, the step of fetching the instruction set of the present invention is performed; in the X decoder 62x, the first control step of decoding the execution instruction in the first field and proceeding with the operation or data processing of that execution instruction by the processing unit that has been preset so as to be ready to execute the operation or data processing of that execution instruction; in the Y decoder 62y, independently of the first control step, the second control step of decoding preparation information in the second field and setting the state of the processing unit so as to be ready to execute the operation or data processing.

The multi-purpose ALU 56 includes the arithmetic unit (ALU) 34 as described in connection with FIG. 5 and a register group 35 for storing input/output data of the ALU 34. Provided that the instructions decoded in the FU 55 are the execution instruction and/or preparation information of the ALU 34, a decode signal φx of the X decoder 62x and a decode signal φy of the Y decoder 62y are supplied respectively to the multi-purpose ALU 56, so that the described processing is performed in the ALU 34 as explained above.

The DFU 57 has a template section 72 where a plurality of templates 71 for configuring one of a plurality data flows or pseudo data flows for various processings are arranged. As described above in connection with FIGS. 9 and 10, each template 71 is the processing unit (processing circuit) having a function as a specific data path or data flow, such as the arithmetic-processing unit (ALU). When the Y decoder 62y decodes the data flow designation instructions 25 described as preparation information in the Y field 12, the respective interfaces and contents of function of processing in the templates 71, i.e., the processing units of the DFU 57, are set based on the signal φy.

Accordingly, it is possible to change the respective connections of the templates 71 and processes in that templates 71 by the data flow designator 25 described in the Y field 12. Thus, with combination of these templates 71, data path(s) suitable for the specific data processing is flexibly configured in the template region 72 by means of the program 18. Thus, dedicated circuitry for the specific processing is provided in the processor 51, whereby the processing therein is conducted independently of the control of the program counter. In other words, due to the data flow designation instructions 25 that are possible to change the respective inputs/outputs of the templates 71 and processes in the templates 71 by software, the hardware of the processor 51 is modified or reconfigured at any time to the configuration suitable for the specific data processing.

Figure 12:
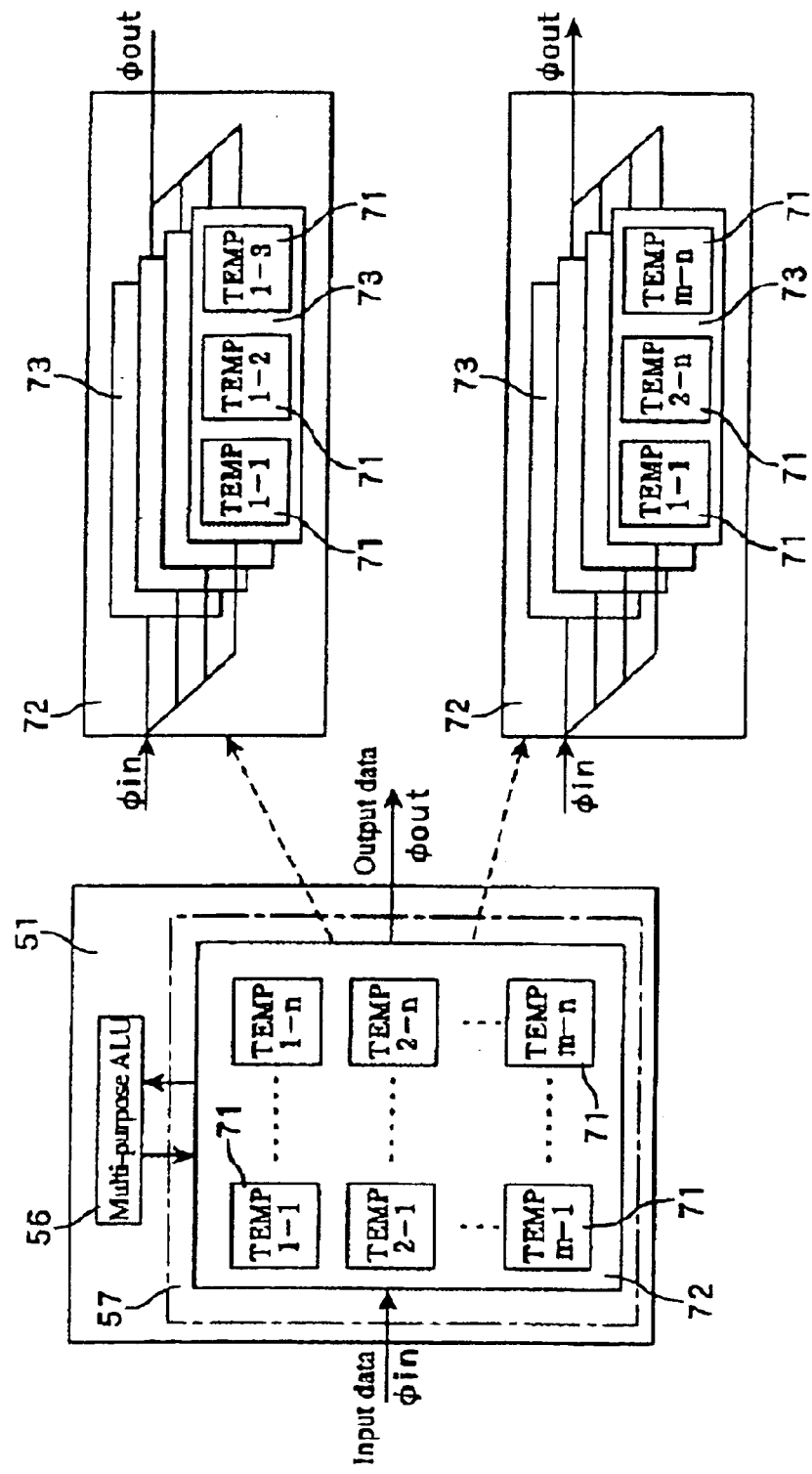
FIG. 12 illustrates how different dedicated circuits are formed with different combinations of templates.

As shown in FIG. 12(a), in order to perform some process on the input data φin to getting the output data φout by the DFU 57 of this processor 51, it is possible to set the respective interfaces of the templates 71 by the data flow designator 25 so that the data processing is performed with the templates 1-1, 1-2 and 1-3 being connected in series with each other as shown in FIG. 12(b). Similarly, for the other templates 71 in the template block 72, it is possible to set their respective interfaces so as to configure data paths or data flows with appropriate combinations of a plurality of templates 71. Thus, a plurality of dedicated or special processing units or dedicated data paths 73 that are suitable for processing the input data φin are configured at any time in the template section 72 by means of the program 18.

On the other hand, in the case where the process for performing on the input data φin is changed, it is possible to change the connection between the templates 71 by the data flow designation instructions 25, as shown in FIG. 12(c). The Y decoder 62y decodes the data flow designation instructions 25 so as to change the respective interfaces of the corresponding templates 71. Such control process (second control step) of the Y decoder 62y enables one or a plurality of data paths 73 suitable for executing another different processings to be configured in the template section 72 with the templates 1-1, 2-n and m-n being connected in series with each other.

In addition, the processing unit formed from single template 71 or combination of a plurality of templates 71 can also be assigned to another processing or another program that is executed in parallel. In the case where a plurality of processors 51 are connected to each other through an appropriate bus, it is also possible to configure a train (data path) 73 having the templates 71 combined for another data processing that is mainly performed by another processor 51, therefore it is possible to use the data processing resources, i.e., the templates 71, extremely effectively.

Moreover, unlike the FPGA intended to cover even implementation of a simple logic gate such as "AND" and "OR", the template 71 of the present invention is a higher-level data processing unit including therein some specific data path which basically has a function as ALU or other logic gates. The respective interfaces of the templates 71 are defined or redefined by the data flow designation instructions 25 so as to change the combination of the templates 71. Thus, a larger data path suitable for desired specific processing is configured. At the same time, the processing content or processing itself performed in the templates 71 can also be defined by the data flow designation instructions 25 changing the connection of the ALU or other logic gates or the like within the template 71. Namely, the processing content performed in the templates 71 are also defined and varied by selecting a part of the internal data path in the template 71.

Accordingly, in the case where the hardware of the DFU 57 having a plurality of templates 71 of this example arranged therein is reconfigured for the specific data processing, re-mapping of the entire chip as in the FPGA or even re-mapping on the basis of a limited logic block is not necessary. Instead, by switching the data paths previously provided in the templates 71 or in the template section 72, or by selecting a part of the data paths, the desired data paths are implemented using the ALUs or logic gates prepared in advance. In other words, within the template 71, connections of the logic gates are only reset or reconfigured within a minimum requirement, and even between the templates 71, the connections are only reset or reconfigured within a minimum required range. This enables the hardware to be changed to the configuration suitable for the specific data processing in a very short or limited time, in units of clock.

Since FPGA incorporates no logic gate, they are extremely versatile. However, FPGA include a large number of wirings that are unnecessary to form logic circuitry for implementing functions of a specific application, and such redundancy hinders reduction in length of signal paths. FPGA occupies a larger area than that of an ASIC that is specific to the application to be executed, and also have degraded AC characteristics. In contrast, the processor 51 employing the templates 71 of this embodiment which incorporate appropriate logic gates in advance is capable of preventing a huge wasteful area from being produced as in the FPGA, and also capable of improving the AC characteristics. Accordingly, the data processing unit 57 in this embodiment based on the templates 71 is a reconfigurable processor capable of changing the hardware by means of a program. Thus, in this invention, it is possible to provide the data processing system having both a higher-level flexibility of software and higher-speed performance of hardware compared to a processor employing FPGAs.

Appropriate logic gates are incorporated in these templates 71 previously, therefore, the logic gates required for performing the specific application are implemented at an appropriate density. Accordingly, the data processing unit using the templates 71 is economical. In the case where the data processor is formed from FPGA, frequent downloading of a program for reconfiguring the logic must be considered in order to compensate for reduction in packaging density. The time required for such downloading also reduces the processing speed. In contrast, since the processor 51 using the templates 71 has a high packaging density, the necessity of compensating for reduction the density is reduced, and frequent reconfiguration of the hardware is less required. Moreover, reconfigurations of the hardware are controlled in the units of clock. In these respects, it is possible to provide a compact, high-speed data processing system capable of reconfiguring the hardware by means of software that is different from the FPGA-based reconfigurable processor.

Moreover, the DFU 57 shown in FIG. 11 includes a configuration register (CREG) 75 capable of collectively defining or setting the respective interfaces and content of processings (hereinafter referred to as configuration data) of the templates 71 arranged in the template section 72, and a configuration RAM (CRAM) 76 storing a plurality of configuration data Ci (hereinafter, i represents an appropriate integer) to be set to the CREG 75. An instruction like "DFSET Ci" is provided as an instruction of the data flow designators 25. When the Y decoder 62y decodes this instruction, desired configuration data among the configuration data Ci stored in the CRAM 76 is loaded into the CREG 75. As a result, configurations of the plurality of templates 71 arranged in the template section 72 are changed collectively. Alternatively, configuration may be changed on the basis of a processing block formed from a plurality of templates 71.

It is also possible to set or change the configuration of the individual template 71 when the Y decoder 62y decodes the data flow designation instruction 25 such as DFLWI or DFLWC explained above. In addition, as mentioned above, since the DFU 57 is capable of changing, with a single instruction, the configurations of a plurality of templates 71 that requires a large amount of information, the instruction efficiency is improved as well as the time expended for reconfiguration is reduced.

The DFU 57 further includes a controller 77 for downloading the configuration data into the CRAM 76 on a block-by-block basis. In addition, "DFLOAD BCi" is provided as an instruction of the data flow designator 25. When the Y decoder 62y decodes this instruction, a number of configuration data Ci for the ongoing processing or the processing that would occur in the future are previously downloaded into the configuration memory, i.e., the CRAM 76, among a large number of configuration data 78 prepared in advance in the data RAM 53 or the like. By this structure, a small-capacity and high-speed associative memory or the like is able to be applied as the CRAM 76 and the hardware becomes reconfigured flexibly and further quickly.

Figure 13:
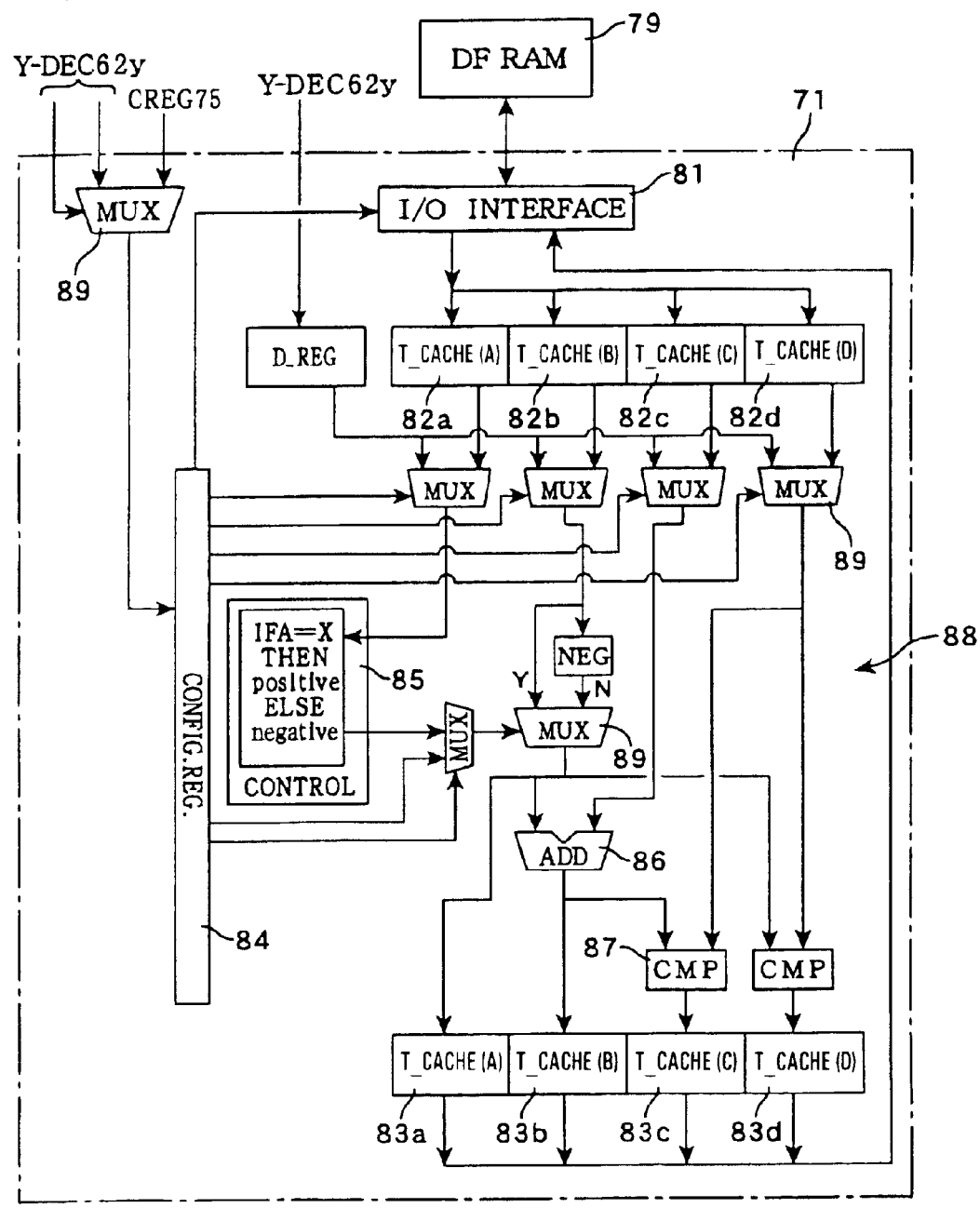
FIG. 13 illustrates one of the templates.

FIG. 13 shows an example of the template 71. This template 71 is capable of exchanging the data with another template 71 through a data flow RAM (DFRAM) 79 prepared in the DFU 57. The processing result of another template 71 is input through an I/O interface 81 to input caches 82a to 82d, and then are processed and output to output caches 83a to 83d. This template 71 has a data path 88 capable of performing the following processing on data A, B, C and D respectively stored in the input caches 82a to 82d, and of storing the operation result in the output cache 83b and storing the comparison result in the output cache 83c. The processing result of the template 71 is again output to another template through the I/O interface 81 and DFRAM 79.

IF A=?

THEN $(C+B)=D$

ELSE $(C-B)=D$        (A)

This template 71 has its own configuration register 84. The data stored in the register 84, in this template 71, controls a plurality of selectors 89 so as to select a signal to be input to the logic gates such as control portion 85, adder 86 and comparator 87. Accordingly, by changing the data in the configuration register 84, in the template 71, another processing using a part of the data path 88 is possible to proceed. For example, in the template 71, the following processing is also provided without using the control portion 85.

$(B+C)=D$ $(B-C)=D$        (B)

Similarly, by changing the data in the configuration register 84, a part of the data path 88 can be used so that the template 71 is utilized as a condition determination circuit using the control portion 85, an addition/subtraction circuit using the adder 86, or a comparison circuit using the comparator 87. These logic gates are formed from dedicated circuitry that is incorporated in the template 71, therefore there is no wasteful parts in terms of the circuit structure and the processing time. In addition, it is possible to change the input and output data configurations to/from the template 71 by the interface 81 that is controlled by the configuration register 84. Thus, the template 71 becomes all or a part of the data flow for performing the desired data processing.

This template 71 is also capable of rewriting the data in its own configuration register 84, based on either one of the data from the aforementioned CREG 75 and the data from the Y decoder (YDEC) 62y of the FU 55, and selection thereof is controlled by a signal from the Y decoder 62y. Namely, configuration of this template 71 is controlled by the Y decoder 62y or the second control step performed by the Y decoder 62y, according to the data flow designation instructions 25. Therefore, both reconfiguration of hardware are possible, the one is to change the hardware configuration of the template 71, based on the DFSET instruction or the like, together with another template(s) according to the configuration data Ci stored in the CRAM 76; and another is to select a part of the specific data path 88 of the template 71 by the data in the configuration register 84 set by the data flow designation instruction 25.

Accordingly, configuration of the templates 71 is changed by the data flow designation instructions 25 either individually or in groups or blocks, whereby the data path of the processor 51 is flexibly reconfigured.

The structure of the template 71 is not limited to the above embodiment. It is possible to provide appropriate types and number of templates having logic gates for combining, selecting a part of inner data-path, and changing the combination of the templates 71 for performing a multiplicity of data processings. More specifically, in the present invention, somewhat compact data paths are provided as several types of templates. Thus, by designating combination of the data paths, the data-flow-type processings are implemented thereby the specific processings are performed in an improved performance condition. In addition, any processing that cannot be handled with the templates is performed with the functions of the multi-purpose ALU 56 of the processor 51. Moreover, in the multi-purpose ALU 56 of this processor, the penalty generated upon branching and others, is minimize by the preparation instructions described in the Y field 12 of the instruction set 10. Therefore, the system LSI 50 incorporating the processor 51 of this embodiment makes it possible to provide a high-performance LSI capable of changing the hardware as flexibly as describing the processing by programs, and it is suitable for high-speed and real-time processing. This LSI also flexibly deals with a change in application, specification without reduction in processing performance resulting from the change in specification.

In the case where the summary of the application to be executed with this system LSI 50 is known at the time of developing or designing the system LSI 50, it is possible to configure the template section 72 mainly with the templates having configuration suitable for the processing of that application. As a result, an increased number of data processings can be performed with the data-flow-type processing, thereby improving the processing performance. In the case where a general-purpose LSI is provided by the system LSI 50, it is possible to configure the template section 72 mainly with the templates suitable for the processing that often occurs in a general-purpose application such as floating-point operation, multiplication and division, image processing or the like.

Thus, the instruction set and the data processing system according to the present invention make it possible to provide an LSI having a data flow or pseudo data flow performing various processings, and by using a software, the hardware for executing the data flow can be changed at any time to the configuration suitable for a specific data processing. Moreover, the aforementioned architecture for conducting the data-flow-type processing by combination of the templates, i.e., the DFU 52 or template region 72, can be incorporated into the control unit or the data processing system such as processor independently of the instruction set 10 having the X field 11 and Y field 12. Thus, it is possible to provide a data processing system capable of conducting the processing at a higher speed, changing the hardware in a shorter time, and also having better AC characteristics, as compared to the FPGA.

It is also possible to configure a system LSI that incorporates the DFU 57 or template region 72 together with a conventional general-purpose embedded processor, i.e., a processor operating with mnemonic codes. In this case, any processing that cannot be handled with the templates 71 can be conducted with the general-purpose processor. As described above, however, the conventional processor has the problems such as branching penalty and wasting of clocks for preparation of registers for arithmetic processing. Accordingly, it is desirable to apply the processor 51 of this embodiment capable of decoding the instruction set 10 having the X and Y fields for execution.

Moreover, with the processor 51 and instruction set 10 of this embodiment, configurations of the DFU 57 are set or changed before execution of the data processing, in parallel with another processing by the Y field 12. This is advantageous in terms of processing efficiency and program efficiency. The program efficiency is also improved by describing a conventional mnemonic instruction code and data-flow-type instruction code into a single instruction set. The function of the Y field 12 of the instruction set 10 of this embodiment is not limited to describing the data-flow-type instruction code as explained above.

The processor according to the present invention is capable of changing physical data path configuration or structure by the Y field 12 prior to execution. In contrast, in the conventional processor, a plurality of multiprocessors are connected to each other only through a shared memory. Therefore, even if there is a processor in the idle state, the internal data processing unit of that processor cannot be utilized from the outside. In the data processor according to the present invention, setting an appropriate data flow enables an unused hardware in the processor to be used by another control unit or data processor.

As secondary effects, in the control unit of the present invention and the processor using the same, efficiency of the instruction execution sequence is improved, as well as independence and improved degree of freedom (availability) of the internal data path is ensured, therefore, the processings are successively executed as long as the executing hardware are available, even if instruction sequences for the processings having contexts of completely different properties are simultaneously supplied.

Now, the advantages of the cooperative design of hardware and software becomes point out flourishingly, and the combination of the instruction set and the control unit of the present invention becomes an answer to the question how algorithms and/or data processes requested by the user are implemented in efficient and economical manner within the allowable hardware costs. For example, based on both the data and/or information relating to the instruction set of the present invention (the former DAP/DNA) reflecting configurations of the data paths those are already implemented, and to the hardware and/or sequence subsequently added for executing the process, new type of combination that is corresponding to the new data path (data flow) described with software, becomes most optimal solutions for the process and contributes for improving performance are led while minimizing the hardware costs.

In the conventional hardware, configuration is less likely to be divided into elements. Therefore, there is no flexibility in combination of the elements, and basically, the major solution for improving performance is to add a single new data path. Therefore, the conventional architecture is hard to evaluate numerically either in terms of accumulating some information for improving performance or of adding hardware information actually implemented for realizing the required improved performance, thereby making it difficult to create a database. In contrast, according to the present invention, since compact data paths are provided as templates and combination of the data paths is designated so as to conduct the data-flow-type processing, cooperation between hardware and software becomes easily estimated in an extremely meticulous manner for improving performance. It is also possible to accumulate trade-off information between hardware and software, therefore, possibility of the combination of data paths may be connected closely to the degree of contribution to the processing performance. This makes it possible to accumulate estimation data relating to he cost, the performance for required processes, and performance for execution those are closely relating to both hardware and software. In addition, since the data paths are implemented without discontinuing execution of the main processing or general-purpose processing, expected result to the addition for the performance request is predicted from the accumulated past data of the hardware and instruction sets of the present invention.

Therefore, the present invention contributes not only to significant reduction in current design and specification costs, but also to completing the next new design with the minimum trade-off between new hardware and software to be added. Moreover, corresponding to the processing type, lending an internal data path to the outside is facilitated, therefore hardware resource sharing becomes possible. Accordingly, parallel processing by a plurality of modules of the present invention (DAP/DNA modules) becomes one of the most useful aspects for implementing compact hardware.

Note that the aforementioned data processing system and instruction set are one of the embodiments of this invention, such that, in the data processor, it is also possible to use an external RAM or ROM instead of the code RAM or data RAM or the like, and to additionally provide an interface with an external DRAM or SRAM or the like. The data processors additionally having known functions as a data processor such as system LSt, e.g., an I/O interface for connection with another external device, are also included in the scope of the present invention. Accordingly, the present invention is understood and appreciated by the terms of the claims below, and all modifications covered by the claims below fall within the scope of the invention.

In a new programming environment provided by the instruction set and the data processing system of the present invention, it is possible to provide further special instructions in addition to those described above. Possible examples include: "XFORK" for activating, in addition to a current program, one or more objects (programs) simultaneously and supporting the parallel processing activation at the instruction level; "XSYNK" for synchronizing objects (programs); "XPIPE" for instructing pipeline connection between parallel processings; and "XSWITCH" for terminating a current object and activating the following object.

As has been described above, the technology including the instruction set of the present invention, programming using the instruction sets, and the data processing system capable of executing the instruction sets are based on the significantly improved principle of instruction-set structure or configuration, therefore, the explained problems that are hard to address with the prior art are solved and significant improvement in performance is achieved.

In this invention, the structure of instruction sets are reviewed and constructed from a completely different standpoint of the conventional way, thus, the instruction set of the present invention extremely efficiently solves many problems that seem to be extremely hard to solve with the prior art. Actually, in the prior art, the structure of instruction-set and the instruction supply (acquisition) method using hardware have been implemented based on the extremely standardized, traditional preconceived ideas, thereby hindering solution of the problems in the essential sense. The conventional attempts to solve all the problems with the huge, complicated hardware configuration have caused a significant increase in costs for developing the technology that is to contribute to the society. The cost is also increased in various information processing products configured based on that technology. In the present invention, the instruction set that should be the original and gives priority to the application requirements, is provided. Therefore, this invention provides means that is not only capable of improving product performance efficiency but also is more likely to attain high development efficiency and quality assurance of the products.

Moreover, according to the present invention, data paths (data flows) capable of contributing to improved performance can be accumulated with the resources, i.e., the templates and the instruction sets for utilizing the templates. Then, the accumulated data paths become possible to be updated at any time based on subsequently added hardware configuration information and sequence information for performing the data processing, so that the optimal solution is easily obtained. Accordingly, by the present invention, resource sharing between applications, resource sharing in hardware and investment of hardware for improving performance, those are conventional pointed out, will be proceeded in more desirable manner, and this invention will be significantly contributable as technology infrastructure for constructing networked society.

INDUSTRIAL APPLICABILITY

The data processing system of the present invention is provided as a processor, LSI or the like capable of executing various data processings, and is applicable not only to the integrated circuits of electronic devices, but also to the optical devices, and even to the optical integrated circuit devices integrating electronic and optical devices. In particular, a control program including the instruction set of the present invention and data processor are capable of flexibly executing the data processing at a high speed, and are preferable for the processes required to have high-speed performance and real-time performance like the network processing and image processing.

I claim:

1. A control program product comprising an instruction set including a first field for describing an execution instruction for designating content of an operation or data processing that is executed in at least one processing unit forming a data processing system, and a second field for describing preparation information for setting the processing unit to a state that is ready to execute the operation or data processing that is executed according to the execution instruction, the preparation information in the second field is for the operation or data processing being independent of the content of the execution instruction described in the first field of the instruction set, wherein the preparation information for the execution instruction described in the first field of a subsequent instruction set is described in the second field.

2. The control program product of claim 1, wherein the preparation information includes information for designating an input and/or output interface of the processing unit independently of execution timing of the processing unit.

3. The control program product of claim 1, wherein the preparation information includes information for designating content of processing of the processing unit.

4. The control program product of claim 1, wherein the data processing system includes a plurality of the processing units, and the preparation information includes information for designating a combination of data paths by the processing units.

5. The control program product of to claim 1, wherein the processing unit includes a specific internal data path, and the preparation information includes information for selecting a part of the internal data path.

6. The control program product of claim 1, wherein the preparation information includes information for designating input/output interfaces in a processing block formed from a plurality of the processing units.

7. The program product of claim 6, wherein the data processing system includes a memory storing a plurality of configuration data defining the input and/or output interfaces in the processing block, and the preparation information includes information for selecting one of the plurality of configuration data stored in the memory for changing the input and/or output interfaces in the processing block.

8. The control program product of claim 1, wherein an instruction designating input/output between a register or buffer and a memory is described in the second field.

9. The control program product of claim 1, wherein a plurality of the execution instructions and/or the preparation information are described in the first and/or second field respectively.

10. A control program product comprising an instruction set including a first field for describing an execution instruction for designating content of an operation or data processing that is executed in at least one processing unit forming a data processing system, and a second field for describing preparation information for setting the processing unit to a state that is ready to execute the operation or data processing that is executed according to the execution instruction, the preparation information in the second field is for the operation or data processing being independent of the content of the execution instruction described in the first field of the instruction set, wherein the data processing system has a first control unit including an arithmetic/logic unit as the processing unit, and a second control unit including as the processing units a plurality of data flow processing units including a specific internal data path, and the control program product includes the instruction set in which the execution instruction for operating the arithmetic/logic unit is described in the first field, and the preparation information designating interfaces of the arithmetic/logic unit and/or the data flow processing units is described in the second field.

11. The control program product of claim 10, wherein the preparation information includes information for designating a combination of data paths by the data flow processing units.

12. The control program product of claim 10, wherein the preparation information includes information for selecting a part of the internal data path.

13. The control program product of claim 10, wherein an instruction designating input/output between a register or buffer and a memory is described in the second field.

14. The control program product of claim 10, wherein a plurality of the execution instructions and/or the preparation information are described in the first and/or second field respectively.

15. A recording medium recording thereon a control program comprising an instruction set including:

a first field for describing an execution instruction for designating content of an operation or data processing that is executed in at least one processing unit forming a data processing system;

a second field for describing preparation information for setting the processing unit to a state that is ready to execute the operation or data processing that is executed according to the execution instruction, the preparation information in the second field being for the operation or data processing that is independent of the content of the execution instruction described in the first field of the instruction set; and a third field for indicating, independently of the first field, valid/invalid of the second field and a type of the preparation information.

16. A transmission medium having embedded therein a control program comprising an instruction set including;

a first field for describing an execution instruction for designating content of an operation or data processing that is executed in at least one processing unit forming a data processing system;

a second field for describing preparation information for setting the processing unit to a state that is ready to execute the operation or data processing that is executed according to the execution instruction, the preparation information in the second field being for the operation or data processing that is independent of the contents of the execution instruction described in the first field of the instruction set; and a third field for indicating, independently of the first field, valid/invalid of the second field and a type of the preparation information.

17. A data processing system, comprising:

at least one processing unit for executing an operation or data processing;

a unit for fetching an instruction set including a first field for describing an execution instruction for designating content of the operation or data processing that is executed in the processing unit, and a second field for describing preparation information for setting the processing unit to a state that is ready to execute the operation or data processing that is executed according to the execution instruction;

a first execution control unit for decoding the execution instruction in the first field and proceeding with the operation or data processing by the processing unit that is preset so as to be ready to execute the operation or data processing of the execution instruction; and a second execution control unit for decoding the preparation information in the second field and, independently of content of the proceeding of the first execution control unit, setting a state of the processing unit so as to be ready to execute an operation or data processing.

18. The data processing system of claim 17, wherein the first or second execution control unit includes a plurality of execution control portions for independently processing a plurality of independent execution instructions or preparation information that are described in the first or second field respectively.

19. The data processing system of claim 17, wherein the second execution control unit sets an input and/or output interface of the processing unit independently of execution timing of the processing unit.

20. The data processing system of claim 17, wherein the second execution control unit defines content of processing of the processing unit.

21. The data processing system of claim 17, comprising a plurality of the processing units, wherein the second execution control unit controls a combination of data paths by the processing units.

22. The data processing system of claim 17, wherein the processing unit includes a specific internal data path.

23. The data processing system of claim 17, wherein the processing unit includes at least one logic gate and an internal data path connecting the logic gate with an input/output interface.

24. The data processing system of claim 22, wherein the second execution control unit selects a part of the internal data path of the processing unit according to the preparation information.

25. The data processing system of claim 17, wherein the second execution control unit changes input and/or output interfaces in a processing block formed from a plurality of the processing units, according to the preparation information.

26. The data processing system of claim 25, comprising a memory storing a plurality of configuration data defining the input and/or output interfaces in the processing block, wherein the second execution control unit changes the input and/or output interfaces in the processing block by selecting one of the plurality of configuration data stored in the memory according to the preparation information.

27. The data processing system of claim 17, wherein the second execution control unit has a function as a scheduler for managing an interface of the processing unit.

28. The data processing system of claim 17, further comprising a first control unit including an arithmetic/logic unit as the processing unit, and a second control unit having as the processing units a plurality of data flow processing units including a specific data path, wherein
the first execution control unit operates the arithmetic/logic unit, and
the second execution control unit sets interfaces of the arithmetic/logic unit and/or the data flow processing units.

29. The data processing system of claim 28, wherein the second execution control unit controls a combination of data paths by the data flow processing units.

30. The data processing system of claim 28, wherein the data flow processing unit has a specific internal data path, and the second execution control unit selects a part of the internal data path of the data flow processing unit according to the preparation information.

31. The data processing system of claim 17, wherein the second execution control unit has a function to control input/output between a register or buffer and a memory.

32. A method for controlling a data processing system including at least one processing unit for executing an operation or data processing comprising:
a step of fetching an instruction set including a first field for describing an execution instruction for designating content of the operation or data processing that is executed in the processing unit, and a second field for describing preparation information for setting the processing unit to a state that is ready to execute the operation or data processing that is executed according to the execution instruction;
a first control step of decoding the execution instruction in the first field and proceeding with the operation or data processing by the processing unit that is preset so as to be ready to execute the operation or data processing of the execution instruction; and
a second control step of decoding independently of the first control step, the preparation information in the second field and setting a state of the processing unit so as to be ready to execute the operation or data processing.

33. The method of claim 32, wherein in the second control step, an input and/or output interface of the processing unit is set independently of execution timing of the processing unit.

34. The method of claim 32, wherein in the second control step, content of processing of the processing unit is defined.

35. The method of claim 32, wherein the data processing system includes a plurality of the processing units, and in the second control step, a combination of data paths by the processing units is controlled.

36. The method of claim 32, wherein the processing unit has a specific internal data path, and in the second control step, a part of the internal data path of the processing unit is selected.

37. The method of claim 31, wherein in the second control step, input and/or output interfaces in a processing block formed from a plurality of the processing units is changed.

38. The method of claim 32, wherein the data processing system includes a memory storing a plurality of configuration data defining the input and/or output interfaces in the processing block, and
in the second control step, the input and/or output interfaces in the processing block are changed by selecting one of the plurality of configuration data stored in the memory.

39. The method of claim 32, wherein in the second control step, a schedule retaining an interface of the processing unit is managed.

40. The method of claim 32, wherein in the second control step, input/output between a register or buffer and a memory is controlled.

41. A control program product comprising an instruction set including:
a first field for describing an execution instruction for designating content of an operation or data processing that is executed in at least one processing unit forming a data processing system;
a second field for describing preparation information for setting the processing unit to a state that is ready to execute the operation or data processing that is executed according to the execution instruction, the preparation information in the second field being for the operation or data processing that is independent of the content of the execution instruction described in the first field of the instruction set; and
a third field for indicating independently of the first field, valid/invalid of the second field and a type of the preparation information.

42. The control program product of claim 41, wherein the preparation information for the execution instruction described in the first field of a subsequent instruction set is described in the second field.

43. The control program product of claim 41, wherein the preparation information includes information for designating an input and/or output interface of the processing unit independently of execution timing of the processing unit.

44. The control program product of claim 41, wherein the preparation information includes information for designating content of processing of the processing unit.

45. The control program product of claim 41, wherein the data processing system includes a plurality of the processing units, and the preparation information includes information for designating a combination of data paths by the processing units.

46. The control program product of to claim 41, wherein the processing unit includes a specific internal data path, and the preparation information includes information for selecting a part of the internal data path.

47. The control program product of claim 41, wherein the preparation information includes information for designating input/output interfaces in a processing block formed from a plurality of the processing units.

48. The program product of claim 47, wherein the data processing system includes a memory storing a plurality of configuration data defining the input and/or output interfaces in the processing block, and the preparation information includes information for selecting one of the plurality of configuration data stored in the memory for changing the input and/or output interfaces in the processing block.

49. The control program product of claim 41, wherein the data processing system has a first control unit including an arithmetic/logic unit as the processing unit, and a second control unit including as the processing units a plurality of data flow processing units including a specific internal data path, and the control program product includes the instruction set in which the execution instruction for operating the arithmetic/logic unit is described in the first field, and the preparation information designating interfaces of the arithmetic/logic unit and/or the data flow processing units is described in the second field.

50. The control program product of claim 49, wherein the preparation information includes information for designating a combination of data paths by the data flow processing units.

51. The control program product of claim 49, wherein the preparation information includes information for selecting a part of the internal data path.

52. The control program product of claim 41, wherein an instruction designating input/output between a register or buffer and a memory is described in the second field.

53. The control program product of claim 41, wherein a plurality of the execution instructions and/or the preparation information are described in the first and/or second field respectively.

54. A data processing system, comprising:

at least one processing unit for executing an operation or data processing;

a unit for fetching an instruction set including a first field for describing an execution instruction for designating content of the operation or data processing that is executed in the processing unit, a second field for describing preparation information for setting the processing unit to a state that is ready to execute the operation or data processing that is executed according to the execution instruction, and a third field for indicating, independently of the first field, valid/invalid of the second field and a type of the preparation information;

a first execution control unit for decoding the execution instruction in the first field and proceeding with the operation or data processing by the processing unit that is preset so as to be ready to execute the operation or data processing of the execution instruction; and a second execution control unit for decoding the preparation information in the second field based on information in the third field and, independently of content of the proceeding of the first execution control unit, setting a state of the processing unit so as to be ready to execute an operation or data processing.

55. A method for controlling a data processing system including at least one processing unit for executing an operation or data processing, comprising:

a step of fetching an instruction set including a first field for describing an execution instruction for designating content of the operation or data processing that is executed in the processing unit, a second field for describing preparation information for setting the processing unit to a state that is ready to execute the operation or data processing that is executed according to the execution instruction, and a third field for indicating, independently of the first field, valid/invalid of the second field and a type of the preparation information;

a first control step of decoding the execution instruction in the first field and proceeding with the operation or data processing by the processing unit that is preset so as to be ready to execute the operation or data processing of the execution instruction; and a second control step of decoding, independently of the first control step, the preparation information in the second field based on information in the third field and setting a state of the processing unit so as to be ready to execute the operation or data processing.

* * * * *

UNITED STATES PATENT AND TRADEMARK OFFICE
CERTIFICATE OF CORRECTION

PATENT NO. : 6,904,514 B1　　　　　　　　　　　　　　　　　　　　　Page 1 of 1
APPLICATION NO. : 09/830704
DATED : June 7, 2005
INVENTOR(S) : Tomoyoshi Sato It is certified that error appears in the above-identified patent and that said Letters Patent is hereby corrected as shown below:

On the title page item (54) and col. 1, Line 1, delete "Data Processor" and insert --Control Program Product and Data Processing System--.

On the title page item (75), Line 1, delete "Tsukuba" and insert --Ibaraki--.

Column 28, Claim 37, Line 11, delete "31" and insert --32--.

Signed and Sealed this

Fifteenth Day of July, 2008

JON W. DUDAS
*Director of the United States Patent and Trademark Office*